US008864255B2

(12) United States Patent
Tombs et al.

(10) Patent No.: US 8,864,255 B2

(45) **Date of Patent: *Oct. 21, 2014**

(54) METHOD FOR PRINTING WITH ADAPTIVE DISTORTION CONTROL

(75) Inventors: Thomas Nathaniel Tombs, Rochester, NY (US); Donald Saul Rimai, Webster, NY (US); Roland Robert Schindler, II, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/334,509

(22) Filed: Dec. 22, 2011

(65) Prior Publication Data

US 2013/0162704 A1 Jun. 27, 2013

(51) Int. Cl.

*H04N 1/034* (2006.01)
*B41J 29/38* (2006.01)

(52) U.S. Cl.

USPC ........... 347/3; 347/9; 347/14; 347/15; 347/19

(58) Field of Classification Search

CPC ......... H04N 1/034; H04N 1/2307; B41J 3/60; B41J 2/0458; B41J 2/04563; B41J 29/38; B41J 29/393

See application file for complete search history.

(56) References Cited

U.S. PATENT DOCUMENTS 4,068,241 A 1/1978 Yamada
4,636,808 A 1/1987 Herron
5,847,721 A 12/1998 Ogata et al.
6,047,143 A * 4/2000 Larson et al. .................. 399/29
6,079,821 A 6/2000 Chwalek et al.
6,402,317 B2 * 6/2002 Yanagawa et al. ............ 347/104
6,457,807 B1 10/2002 Hawkins et al.
6,491,362 B1 12/2002 Jeanmaire
6,505,921 B2 1/2003 Chwalek et al.
6,554,410 B2 4/2003 Jeanmaire et al.
6,575,566 B1 6/2003 Jeanmaire et al.
6,585,367 B2 * 7/2003 Gore ............................ 347/102
6,588,888 B2 7/2003 Jeanmaire et al.
6,608,641 B1 8/2003 Alexandrovich et al.
6,632,510 B1 10/2003 Waller, Jr. et al.
6,702,425 B1 3/2004 Yip et al.
6,731,898 B1 * 5/2004 Landa et al. .................. 399/298
6,767,092 B2 * 7/2004 May et al. ..................... 347/103
6,793,328 B2 9/2004 Jeanmaire
6,827,429 B2 12/2004 Jeanmaire et al.
6,837,578 B2 * 1/2005 Tanikawa et al. ............ 347/103
6,851,796 B2 2/2005 Jeanmaire et al.
6,853,813 B2 * 2/2005 Miyazaki .......................... 399/2
6,966,712 B2 * 11/2005 Trelewicz et al. .............. 400/76
7,232,214 B2 6/2007 Yip et al.

(Continued)

*Primary Examiner* — Manish S Shah
*Assistant Examiner* — Jeremy Delozier
(74) *Attorney, Agent, or Firm* — Roland R. Schindler; David A. Novais

(57) ABSTRACT

Printing methods are provided. In one method, printing an inkjet image using a liquid hydrophilic inkjet ink onto a surface of a semi-absorbent recording medium generating a toner image having toner particles arranged conforming to the inkjet image and transferring the toner image onto the recording medium where an unabsorbed volume of the inkjet ink is present on the recording medium. The toner particles manage unabsorbed volumes of the inkjet ink to protect the recording medium from image artifacts that can be created by an unabsorbed volume of the inkjet ink on the surface without a liquid management toner image.

8 Claims, 22 Drawing Sheets

(56) References Cited

U.S. PATENT DOCUMENTS

| | | | | |
|---|---|---|---|---|
| 7,281,790 | B2 * | 10/2007 | Mouri et al. | 347/103 |
| 7,502,582 | B2 * | 3/2009 | Ng et al. | 399/296 |
| 2006/0133870 | A1 | 6/2006 | Ng et al. | |
| 2006/0284951 | A1 * | 12/2006 | Ikeda et al. | 347/103 |
| 2009/0231621 | A1 * | 9/2009 | Kuwahara | 358/1.15 |
| 2010/0134572 | A1 * | 6/2010 | Satoh et al. | 347/85 |

* cited by examiner

METHOD FOR PRINTING WITH ADAPTIVE DISTORTION CONTROL

CROSS REFERENCE TO RELATED APPLICATIONS

This application relates to commonly assigned, copending U.S. application Ser. No. 13/334,574 filed Dec. 22, 2011, entitled: "INKJET PRINTING METHOD WITH ENHANCED DEINKABILITY"; U.S. application Ser. No. 13/334,661, filed Dec. 22, 2011, entitled: "INKJET PRINTER WITH ENHANCED DEINKABILITY"; U.S. application Ser. No. 13/334,683, filed Dec. 22, 2011, entitled: "LIQUID ENHANCED FIXING METHOD"; U.S. application Ser. No. 13/334,707, filed Dec. 22, 2011, entitled: "PRINTER WITH LIQUID ENHANCED FIXING SYSTEM"; U.S. application Ser. No. 13/334,453, filed Dec. 22, 2011, entitled: "INKJET PRINTING ON SEMI-POROUS OR NON-ABSORBENT SURFACES"; U.S. application Ser. No. 13/334,473, filed Dec. 22, 2011, entitled: "INKJET PRINTER FOR SEMI-POROUS OR NON-ABSORBENT SURFACES"; U.S. application Ser. No. 13/334,487, filed Dec. 22, 2011, entitled: "METHOD FOR PRINTING ON LOCALLY DISTORTABLE MEDIUMS"; U.S. application Ser. No. 13/334,495, filed Dec. 22, 2011, entitled: "PRINTER FOR USE WITH LOCALLY DISTORTABLE MEDIUMS", and U.S. application Ser. No. 13/334,524, filed Dec. 22, 2011, entitled: "PRINTER WITH ADAPTIVE DISTORTION CONTROL", each of which is hereby incorporated by reference.

FIELD OF THE INVENTION

This relates to the field of printing.

BACKGROUND OF THE INVENTION

The registration of image upon image is important in printing, especially when making color prints. If all printing is done in a single print engine, macroscopic registration techniques suffice. For print engines that use roll or web fed paper sources, the roll or web is generally clamped by the machine and macroscopic registration, i.e. the registration of one image upon another over the entire print receiver, is generally accomplished. For example, cyan, magenta, yellow, and black color separations can be sufficiently accurately registered by tracking the entire receiver.

In a sheet fed printing engine, registration is often more problematic than in a roll fed print engine. In a sheet fed print engine, each sheet of paper moves from one module that prints a specific color to the next, which prints another color. Each color must be kept in registration with each other color. This is generally accomplished using macroregistration whereby either the position of the sheet of paper is tracked by locating one or more edges of the paper or fiducials are printed on the page for each color and the timing and/or lateral positioning of the image printing made on modules within a print engine is adjusted to register the images. Conventionally such approaches make adjustments to the printing process that are applied uniformly such as magnification variations.

In digital printing, especially in digital printing requiring more than one type of printing or more than a single print engine to print the image, it is not sufficient to simply macroscopically register images. Rather, the heating associated with fusing in an electrophotographic printing process shrinks localized portions of the paper as moisture is emitted from the paper. Reabsorption of moisture can result in subsequent swelling of the paper. The degree of shrinking and swelling can vary from sheet to sheet and from one site on the paper to another on a sheet and can be random and non-uniform.

In particular it will be understood that many liquid absorbent and semi-absorbent receivers used in printing are dried to a moisture content of approximately 5% by weight, corresponding to the moisture content of paper equilibrated at room temperature to a relative humidity of approximately 40 to 50%. The drying of paper during production creates generally flat sheets however during such drying stresses are induced in the paper. During ink jet printing however, a substantial volume of fluid is rapidly reintroduced into the paper and this can have the effect of non-uniformly releasing the balance of stresses that maintain the flatness of the dry paper. This causes bending and warping of the paper causing localized spatial distortions not only in the plane of the paper but also in a direction that is perpendicular to the paper. This makes the likelihood of image defects greater as the paper is not at the distance that an inkjet print head expects the paper to be at during printing and also increases the surface area of the receiver in the vicinity of the distortion which then results in a distorted image.

Moreover, the swelling that occurs upon absorption of moisture generally does not occur in the locations or have the correct size to correct for the shrinkage. The magnitude of these distortions is not predictable. As a result, misregistration on the pixel level between prints can occur. The absorption of fluid especially water from a hydrophilic ink can cause the paper to locally swell. Subsequent drying does not have the effect of restoring either the shape or the original size of the paper, creating distortions which might not correspond in either location or magnitude to the previous swelling. This can cause misregistration of images on a microscopic scale even if macroscopic registration is maintained. This is consistent with common experience with the effect of wetting and drying a flat sheet of paper.

Accordingly, what is needed is a method to correct for such microscopic misregistration. Specifically, the distortions can result in the positions of pixels, letters, characters, or other image specific data shifting despite the fact that the receiver may be macroscopically in register. The shift in the location of this information can result in the misregistration of certain specific pixels despite the fact that, overall, the images are in register when multiple printers are used. This can be especially problematic in electrophotographic technology which has a drying effect on a receiver used in conjunction with inkjet printing which as noted above provides a drying effect.

SUMMARY OF THE INVENTION

Printing methods are provided. In one method, printing an inkjet image using a liquid hydrophilic inkjet ink onto a surface of a semi-absorbent recording medium generating a toner image having toner particles arranged conforming to the inkjet image and transferring the toner image onto the recording medium where an unabsorbed volume of the inkjet ink is present on the recording medium. The toner particles manage unabsorbed volumes of the inkjet ink to protect the recording medium from image artifacts that can be created by an unabsorbed volume of the inkjet ink on the surface without a liquid management toner image.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
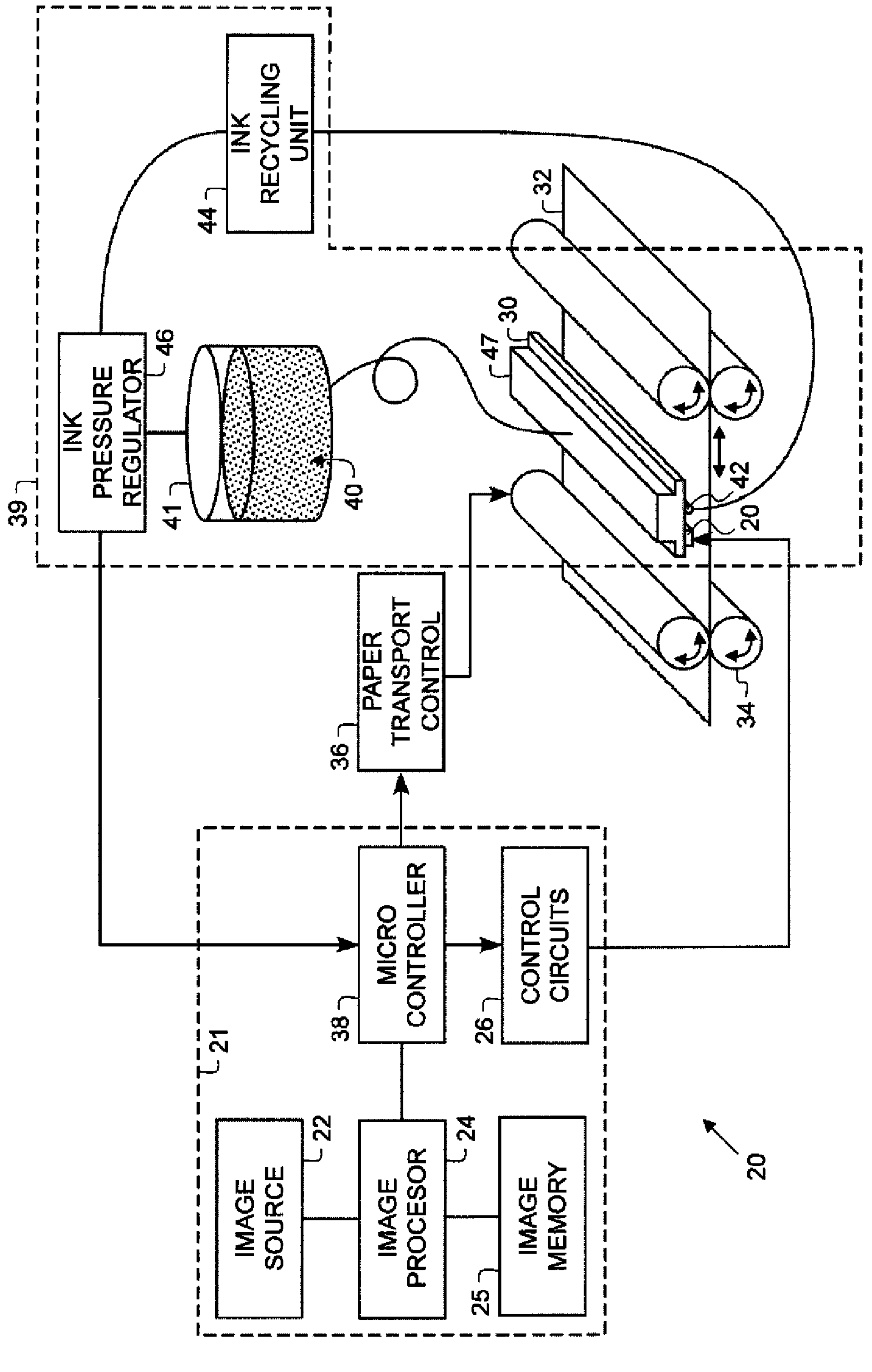
FIG. 1 is a schematic diagram of one embodiment of a continuous inkjet printer.

FIG. 1 shows one embodiment of an inkjet printer 20. As is shown in the embodiment of FIG. 1, inkjet printer 20 has a control system 21 with an image source 22, an image processor 24, an image memory 25, control circuits 26 and a microcontroller 38, image data is received from an image source 22, e.g., a scanner, computer or communication module. Image source 22 can be integral to inkjet printer 20 or otherwise. The image data can take the form of raster image data, outline image data in the form of a page description language, or any other form of digital data that can be used to form a digital image that can be printed. This raster image data is converted to bitmap image data by image processor 24 and is optionally stored in image memory 25.

Inkjet printer 20 forms an inkjet image by transferring drops of an ink 40 that carry an image forming material, such as a colorant, in a liquid such as a solvent or dispersant that either dissolves or disperses the image forming material. The colorant can be in particulate form such as pigment particles. Alternatively, the colorant can be a dye that is either dissolved or dispersed in the solvent. Inkjet ink 40 can also contain other components such as surfactants, dispersants that impart electrical charge to pigment particles to create a stable suspension, humectants, and fungicides. Oliophilic solvent-based inkjet inks are known, but most inkjet inks use hydrophilic solvents such as water or a low-carbon-containing alcohol.

For the purposes of this application, hydrophilic liquids are defined as liquids that are wholly or substantially miscible with water. These include water-based solutions and suspensions such as inkjet inks containing pigments or dyes, water-based solutions, and low carbon alcohols, i.e. alcohols containing four or fewer carbons. Such alcohols include methanol, ethanol, propanol, butanol, isopropanol, isobutanol, and glycol. Not all components of a hydrophilic liquid are necessarily soluble in water. For example, certain inkjet inks contain less than 10% (and generally less than 5%) pigment particles that are not soluble in water. Even though the pigment particles are not soluble in water, the inkjet ink is a hydrophilic liquid.

Ink 40 is patterned and delivered in the form of drops using an inkjet printhead 30. Inkjet printhead 30 has a plurality of control circuits (not shown) that apply time-varying electrical pulses to one or more drop forming device(s) (not shown) each associated with one or more nozzles of printhead 30. These pulses are applied at an appropriate time, and to the appropriate nozzle, so that drops formed will be applied to a recording medium 32 at positions designated by the data in the image memory 25.

Recording medium 32 is moved relative to printhead 30 by a recording medium transport system 34, which is electronically controlled by a recording medium transport control system 35, which in the embodiment of FIG. 1 is controlled by microcontroller 38 of control system 21. Microcontroller 38 controls the timing of control circuits 26 and recording medium transport system 34 so that drops of inkjet ink 40 land at the desired locations on recording medium 32. Microcontroller 38 can be implemented using a central processing unit, a programmable logic device, programmable logic array, programmable array logic, a field programmable array, programmable logic device, a microcontroller, or any other digital stored-program or stored-logic control element or a hard-wired controller.

Recording medium transport system 34 is shown in FIG. 1 in schematic form and many different mechanical configurations are possible. For example, a transfer roller can be used in recording medium transport system 34 to facilitate transfer of the drops of ink 40 to recording medium 32. With page-width type printhead 30 shown in FIG. 1, recording medium 32 can be moved past printhead 30 without moving printhead 30. Alternatively, with scanning print systems, printhead 30 can be moved along one axis (the sub-scanning or fast-scan direction), and the recording medium can be moved along an orthogonal axis (the main scanning or slow-scan direction) in a relative raster motion.

In the embodiment shown in FIG. 1, inkjet printer 20 has a continuous inkjet print engine 39 in which a printhead 30 ejects a filament of ink 40 through a nozzle bore from which ink drops are continually formed using a drop forming device. The ink drops are directed to a desired location using electrostatic deflection, heat deflection, gas-flow deflection, or other deflection techniques. "Deflection" refers to a change in the direction of motion of a given drop. For simplicity, drops will be described herein as either undeflected or deflected. However, "undeflected" drops can be deflected by a certain amount, and "deflected" drops deflected by more than the certain amount. Alternatively, "deflected" and "undeflected" drops can be deflected in opposite directions.

In various embodiments, to print in an area of a recording medium 32 undeflected ink drops are permitted to strike the recording medium. To provide unprinted areas of the recording medium, drops which would land in that area if undeflected are instead deflected into an ink capturing mechanism such as a catcher, interceptor, or gutter. These captured drops can be discarded or returned to ink reservoir 41 for re-use. In other embodiments, deflected ink drops strike recording medium 32 to form printed drops and undeflected ink drops are collected in ink capturing mechanism to provide non-printing areas.

Inkjet ink 40 is contained in ink reservoir 41 under pressure. In the non-printing state, continuous inkjet drop streams are not permitted to reach recording medium 32. Instead, they are caught in ink catcher 42, which can return a portion of the ink to ink recycling unit 44. Ink recycling unit 44 reconditions the ink and feeds it back to ink reservoir 41. Ink recycling units can include filters. A preferred ink pressure for a given printer can be selected based on the geometry and thermal properties of the nozzles and the thermal properties of the ink. Ink pressure regulator 46 controls the pressure of ink applied to ink reservoir 40 to maintain ink pressure within a desired range. Alternatively, ink reservoir 40 can be left unpressurized (gauge pressure approximately zero, so air in ink reservoir 40 is at approximately 1 atm of pressure), or can be placed under a negative gauge pressure (vacuum). In these embodiments, a pump (not shown) delivers ink from ink reservoir 40 under pressure to the printhead 30. Ink pressure regulator 46 can include an ink pump control system.

Ink 40 is distributed to printhead 30 through an ink manifold 47. Ink manifold 47 can include one or more ink channels or ports. Ink 40 flows through slots or holes (not shown) etched through a silicon substrate of printhead 30 to the front surface of printhead 30, where a plurality of nozzles and drop forming mechanisms (not shown), for example, heaters, are situated. When printhead 30 is fabricated from silicon, drop forming mechanism control circuits 26 can be integrated with the printhead. Printhead 30 also includes a deflection mechanism (not shown in FIG. 1) which is described in more detail below with reference to FIGS. 2 and 3.

Figure 2:
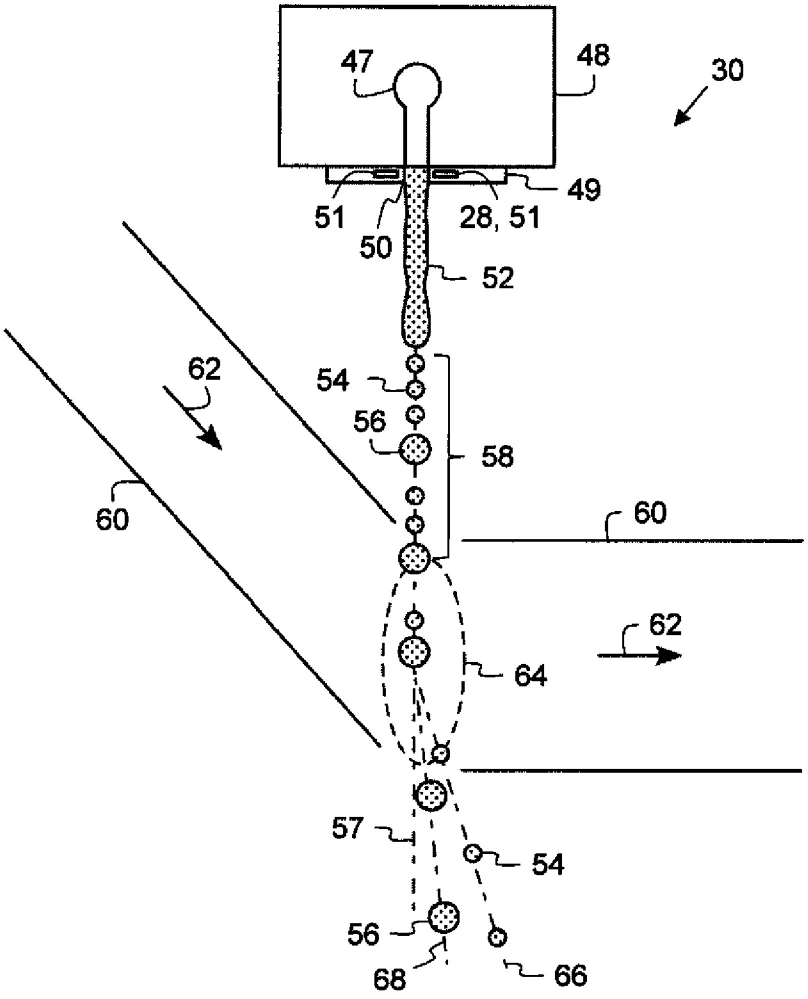
FIG. 2 is an elevational cross-section of a continuous inkjet printhead.

FIG. 2 is an elevational cross-section view of one embodiment of a continuous inkjet printhead 30. A jetting module 48 of printhead 30 includes an array or a plurality of nozzles 50 formed in nozzle plate 49. In FIG. 2, nozzle plate 49 is affixed to jetting module 48. Nozzle plate 49 can also be an integral portion of the jetting module 48.

Liquid, for example, ink, is emitted under pressure through each nozzle 50 of the array to form filaments 52 of liquid. In FIG. 2, the array or plurality of nozzles extends into and out of the plane of the figure.

Jetting module 48 is operable to form, through each nozzle, liquid drops having a first size or volume and liquid drops having a second size or volume different from the first size or volume. The two sizes are referred to as "small" and "large" relative to each other; no limitation of magnitude or difference in magnitude should be inferred from this terminology. Small drops can be either undeflected or deflected, as can large drops. To produce two sizes of drops, jetting module 48 includes a drop stimulation or drop forming device 28, for example, a heater or a piezoelectric actuator. When drop-forming device 28 is selectively activated, it provides energy that perturbs filament 52 of liquid to induce portions of each filament 52 to break off from filament 52 and coalesce to form drops, e.g., small drops 54 or large drops 56.

In FIG. 2, drop forming device 28 is a heater 51, for example, an asymmetric heater or a ring heater (either segmented or not segmented), located in a nozzle plate 49 on one or both sides of nozzle 50. Examples of this type of drop formation are described in, for example, U.S. Pat. No. 6,457,807, issued to Hawkins et al., on Oct. 1, 2002; U.S. Pat. No. 6,491,362, issued to Jeanmaire, on Dec. 10, 2002; U.S. Pat. No. 6,505,921, issued to Chwalek et al., on Jan. 14, 2003; U.S. Pat. No. 6,554,410, issued to Jeanmaire et al., on Apr. 29, 2003; U.S. Pat. No. 6,575,566, issued to Jeanmaire et al., on Jun. 10, 2003; U.S. Pat. No. 6,588,888, issued to Jeanmaire et al., on Jul. 8, 2003; U.S. Pat. No. 6,793,328, issued to Jeanmaire, on Sep. 21, 2004; U.S. Pat. No. 6,827,429, issued to Jeanmaire et al., on Dec. 7, 2004; and U.S. Pat. No. 6,851,796, issued to Jeanmaire et al., on Feb. 8, 2005, the disclosures of all of which are incorporated herein by reference.

Typically, one drop forming device 28 is associated with each nozzle 50. However, a drop forming device 28 can be associated with groups of nozzles 50 or all of nozzles 50 of printhead 30.

When printhead 30 is in operation, drops 54, 56 are typically created in a plurality of sizes or volumes, for example, in the form of large drops 56, a first size or volume, and small drops 54, a second size or volume. The ratio of the mass of the large drops 56 to the mass of the small drops 54 is typically approximately an integer between 2 and 10. A drop stream 58 including drops 54, 56 follows a drop path or trajectory 57.

Printhead 30 also includes a gas flow deflection mechanism 60 that directs a gas flow 62, for example, air, past a portion of the drop trajectory 57. This portion of the drop trajectory is called the deflection zone 64. As the gas flow 62 interacts with drops 54, 56 in deflection zone 64 it alters the drop trajectories. As the drop trajectories pass out of the deflection zone 64 they are traveling at an angle, called a deflection angle, relative to the undeflected drop trajectory 57.

In this embodiment, small drops 54 are more affected by gas flow 62 than are large drops 56 so that the small drop trajectory 66 diverges from the large drop trajectory 68. That is, the deflection angle for small drops 54 is larger than for large drops 56. The gas flow 62 provides sufficient drop deflection and therefore sufficient divergence of the small and large drop trajectories so that catcher 42 (shown in FIGS. 1 and 3) can be positioned to intercept one of the small drop trajectory 66 and the large drop trajectory 68 so that drops following the trajectory are collected by catcher 42 while drops following the other trajectory bypass the catcher 42 and impinge a recording medium 32 (shown in FIGS. 1 and 3).

When catcher 42 (shown in FIG. 1) is positioned to intercept large drop trajectory 68, small drops 54 are deflected sufficiently to avoid contact with catcher 42 and strike recording medium 32 or a transfer surface. As the small drops 54 are printed, this is called small drop print mode. When catcher 42 is positioned to intercept small drop trajectory 66, large drops 56 are the drops that print. This is referred to as large drop print mode.

Various embodiments can use gas flow deflection as described in U.S. Pat. No. 6,588,888 or U.S. Pat. No. 4,068,241, or electrostatic deflection as described in U.S. Pat. No. 4,636,808, the disclosures of all of which are incorporated herein by reference.

Figure 3:
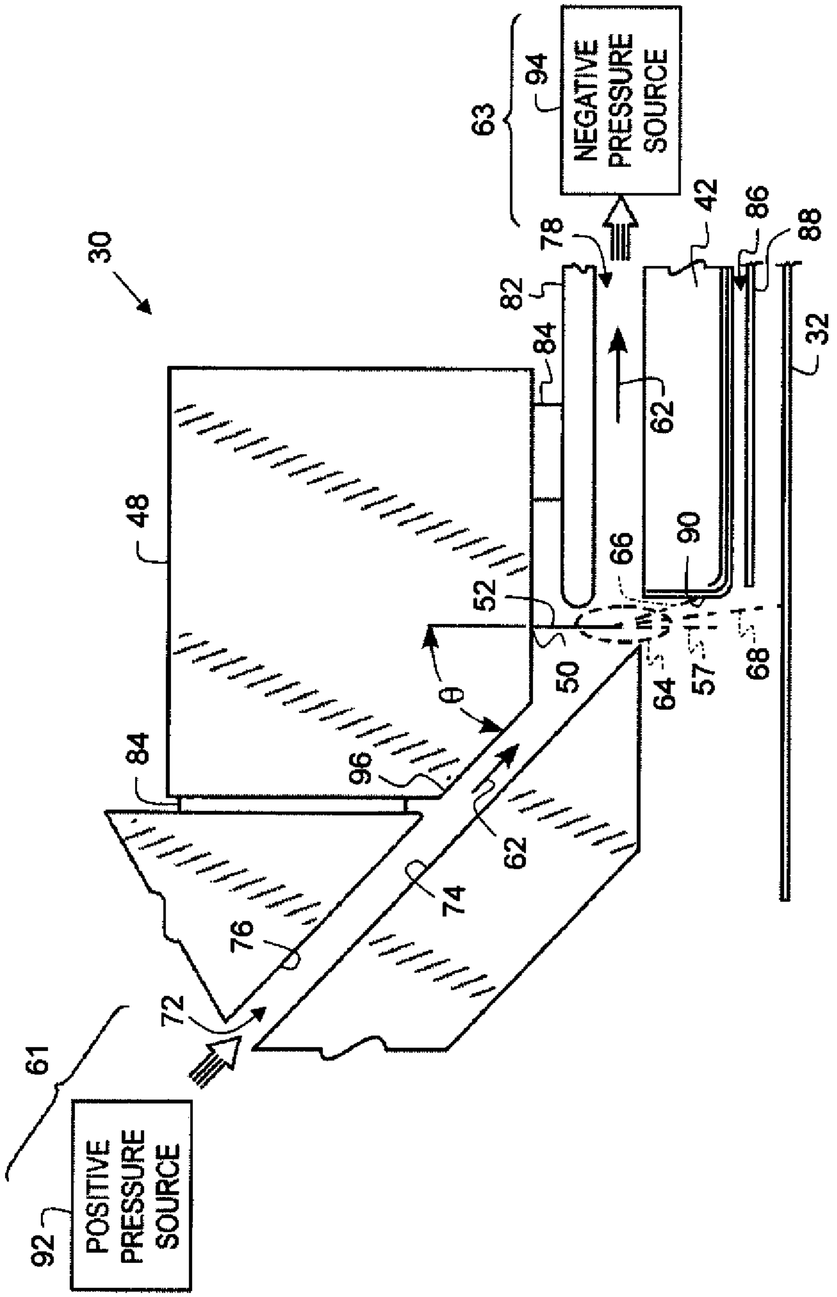
FIG. 3 is an elevational cross-section of portions of a continuous-inkjet printer useful with various embodiments.

FIG. 3 is an elevational cross-section of portions of another embodiment of a continuous inkjet type of printhead 30. In this embodiment, a jetting module 48 includes an array or a plurality of nozzles 50. Liquid, for example, ink, supplied through manifold 47 (see FIGS. 1 and 2), is emitted under pressure through each nozzle 50 of the array to form filaments 52 of liquid. In FIG. 3, the array or plurality of nozzles 50 extends into and out of the figure.

Drop stimulation or drop forming device 28 (shown in FIGS. 1 and 2) associated with jetting module 48 is selectively actuated to perturb the filament 52 of liquid to induce portions of the filament to break off from the filament to form drops. In this way, drops are selectively created in the form of large drops and small drops that travel toward a recording medium 32.

Positive pressure gas flow structure 61 of gas flow deflection mechanism 60 is located on a first side of drop trajectory 57. Positive pressure gas flow structure 61 includes first gas flow duct 72 that includes a lower wall 74 and an upper wall 76. Gas flow duct 72 directs gas flow 62 supplied from a positive pressure source 92 at downward angle θ of approximately 45° relative to liquid filament 52 toward drop deflection zone 64 (also shown in FIG. 2). An optional seal(s) 84 provides an air seal between jetting module 48 and upper wall 76 of gas flow duct 72.

Upper wall 76 of gas flow duct 72 does not need to extend to drop deflection zone 64 (as shown in FIG. 2). In FIG. 3, upper wall 76 ends at a wall 96 of jetting module 48. Wall 96 of jetting module 48 serves as a portion of upper wall 76 ending at drop deflection zone 64.

Negative pressure gas flow structure 63 of gas flow deflection mechanism 60 is located on a second side of drop trajectory 57. Negative pressure gas flow structure includes a second gas flow duct 78 located between catcher 42 and an upper wall 82 that exhausts gas flow from deflection zone 64. Second duct 78 is connected to a negative pressure source 94 that is used to help remove gas flowing through second duct 78. An optional seal(s) 84 provides an air seal between jetting module 48 and upper wall 82.

As shown in FIG. 3, gas flow deflection mechanism 60 includes positive pressure source 92 and negative pressure source 94. However, depending on the specific application contemplated, gas flow deflection mechanism 60 can include only one of positive pressure source 92 and negative pressure source 94.

Gas supplied by first gas flow duct 72 is directed into the drop deflection zone 64, where it causes large drops 56 to follow large drop trajectory 68 and small drops 54 to follow small drop trajectory 66. As shown in FIG. 3, small drop trajectory 66 is intercepted by a front face 90 of catcher 42. Small drops 54 contact face 90 and flow down face 90 and into a liquid return duct 86 located or formed between catcher 42 and a plate 88. Collected liquid is either recycled and returned to ink reservoir 41 (shown in FIG. 1) for reuse or discarded. Large drops 56 bypass catcher 42 and travel on to recording medium 32. Alternatively, catcher 42 can be positioned to intercept large drop trajectory 68. Large drops 56 contact catcher 42 and flow into a liquid return duct located or formed in catcher 42. Collected liquid is either recycled for reuse or discarded. Small drops 54 bypass catcher 42 and travel on to recording medium 32.

Alternatively, deflection can be accomplished by applying heat asymmetrically to filament 52 of liquid using an asymmetric heater 51. When used in this capacity, asymmetric heater 51 typically operates as the drop forming mechanism in addition to the deflection mechanism. Examples of this type of drop formation and deflection are described in, for example, U.S. Pat. No. 6,079,821, issued to Chwalek et al., on Jun. 27, 2000, the disclosure of which is incorporated herein by reference.

Deflection can also be accomplished using an electrostatic deflection mechanism. Typically, the electrostatic deflection mechanism either incorporates drop charging and drop deflection in a single electrode, like the one described in U.S. Pat. No. 4,636,808, or includes separate drop charging and drop deflection electrodes. Continuous inkjet printer systems can also use electrostatic drop deflection mechanisms, pressure-modulation or vibrating-body stimulation devices, or nozzle plates fabricated out of silicon or non-silicon materials or silicon compounds.

As shown in FIG. 3, catcher 42 is a type of catcher commonly referred to as a "Coanda" catcher. However, a "knife edge" catcher can also be used. Alternatively, catcher 42 can be of any suitable design including, but not limited to, a porous face catcher, a delimited edge catcher, or combinations of any of those described above.

Figure 4:
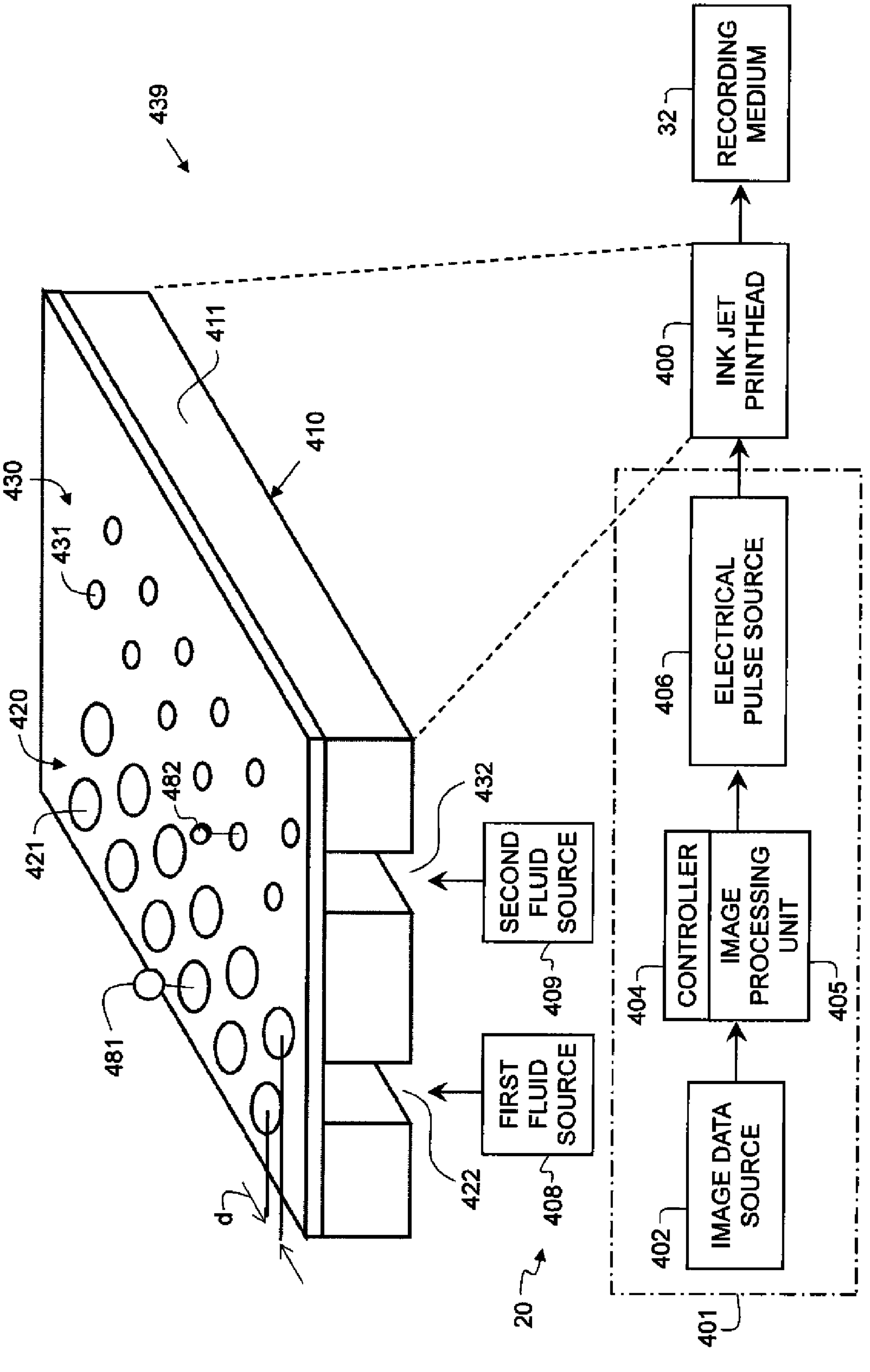
FIG. 4 is a schematic diagram of a drop-on-demand inkjet printer.

FIG. 4 is a schematic of another embodiment of an inkjet printer 20. In this embodiment inkjet printer is 20 has drop-on-demand inkjet subsystem 439. The embodiment of FIG. 4 shows inkjet printer 20 having a control system 401 that includes an image data source 402, which provides data signals that are interpreted by a controller 404 as being commands to eject drops. In this embodiment, inkjet printer 20 is operated by a control system 401 that includes an image data source, 402, a controller 404, an image processing unit 405 and an inkjet printhead which can be integral to controller 404 or separate therefrom. In operation, control system 401 receives data indicating what is to be printed and how, and causes image processing unit 405 to convert such data into images for printing. The images for printing are used to provide signals to electrical pulse source 406. Electrical pulse source 406 produces electrical energy pulses that are inputted to an inkjet printhead 400 that includes at least one inkjet printhead die 410 and these pulses cause inkjet printhead 400 to print inks. Further details of such a drop-on-demand inkjet subsystem are provided in U.S. Pat. No. 7,350,902, the disclosure of which is incorporated herein by reference.

In the example shown in FIG. 4, there are two nozzle arrays. Nozzles 421 in the first nozzle array 420 have a larger opening area than nozzles 431 in the second nozzle array 430. In this example, each of the two nozzle arrays has two staggered rows of nozzles, each row having a nozzle density of 600 per inch. The effective nozzle density then in each array is 1200 per inch (i.e. spacing d=1/1200 inch in FIG. 4). If pixels on recording medium 32 were sequentially numbered along a recording medium advance direction, the nozzles from one row of an array would print the odd numbered pixels, while nozzles from the other row of the array would print the even numbered pixels.

In fluid communication with each nozzle array is a corresponding ink delivery pathway. Ink delivery pathway 422 is in fluid communication with the first nozzle array 420, and ink delivery pathway 432 is in fluid communication with the second nozzle array 430. Portions of ink delivery pathways 422 and 432 are shown in FIG. 4 as openings through printhead die substrate 411. One or more inkjet printhead die 410 are included in an inkjet printhead, but for greater clarity only one inkjet printhead die 410 is shown in FIG. 4. The printhead dies are arranged on a support member. In FIG. 4, first fluid source 408 supplies ink to first nozzle array 420 via ink delivery pathway 422, and second fluid source 409 supplies ink to second nozzle array 430 via ink delivery pathway 432. Although distinct fluid sources 408 and 409 are shown, in some applications it can be beneficial to have a single fluid source supplying ink to both the first nozzle array 420 and the second nozzle array 430 via ink delivery pathways 422 and 432 respectively. Also, in some embodiments, fewer than two or more than two nozzle arrays can be included on printhead die 410. In some embodiments, all nozzles on inkjet printhead die 410 can be the same size, rather than having multiple sized nozzles on inkjet printhead die 410.

Not shown in FIG. 4 are the drop forming mechanisms associated with the nozzles. Drop forming mechanisms can be of a variety of types, some of which include a heating element to vaporize a portion of ink and thereby cause ejection of a drop, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 406 are sent to the various drop ejectors according to the desired deposition pattern. In the example of FIG. 4, drops 481 ejected from the first nozzle array 420 are larger than drops 482 ejected from the second nozzle array 430, due to the larger nozzle opening area. Typically other aspects of the drop forming mechanisms (not shown) associated respectively with nozzle arrays 420 and 430 are also sized differently in order to customize the drop ejection process for the different sized drops. During operation, drops of ink are deposited on a recording medium 32.

An assembled drop-on-demand inkjet printhead (not shown) includes a plurality of printhead dies, each similar to printhead die 410, and electrical and fluidic connections to those dies. Each die includes one or more nozzle arrays, each connected to a respective ink source. In an example, three dies are used, each with two nozzle arrays, and the six nozzle arrays on a printhead are respectively connected to cyan, magenta, yellow, text black, and photo black inks, and a colorless protective printing fluid. Each of the six nozzle arrays is disposed along a nozzle array direction and can be ≤1 inch long. Typical lengths of recording media are 6 inches for photographic prints (4 inches by 6 inches) or 11 inches for paper (8.5 by 11 inches). Thus, in order to print a full image, a number of swaths are successively printed while moving the printhead across recording medium 32. Following the printing of a swath, the recording medium 32 is advanced along a media advance direction that is substantially parallel to the nozzle array direction.

Figure 5:
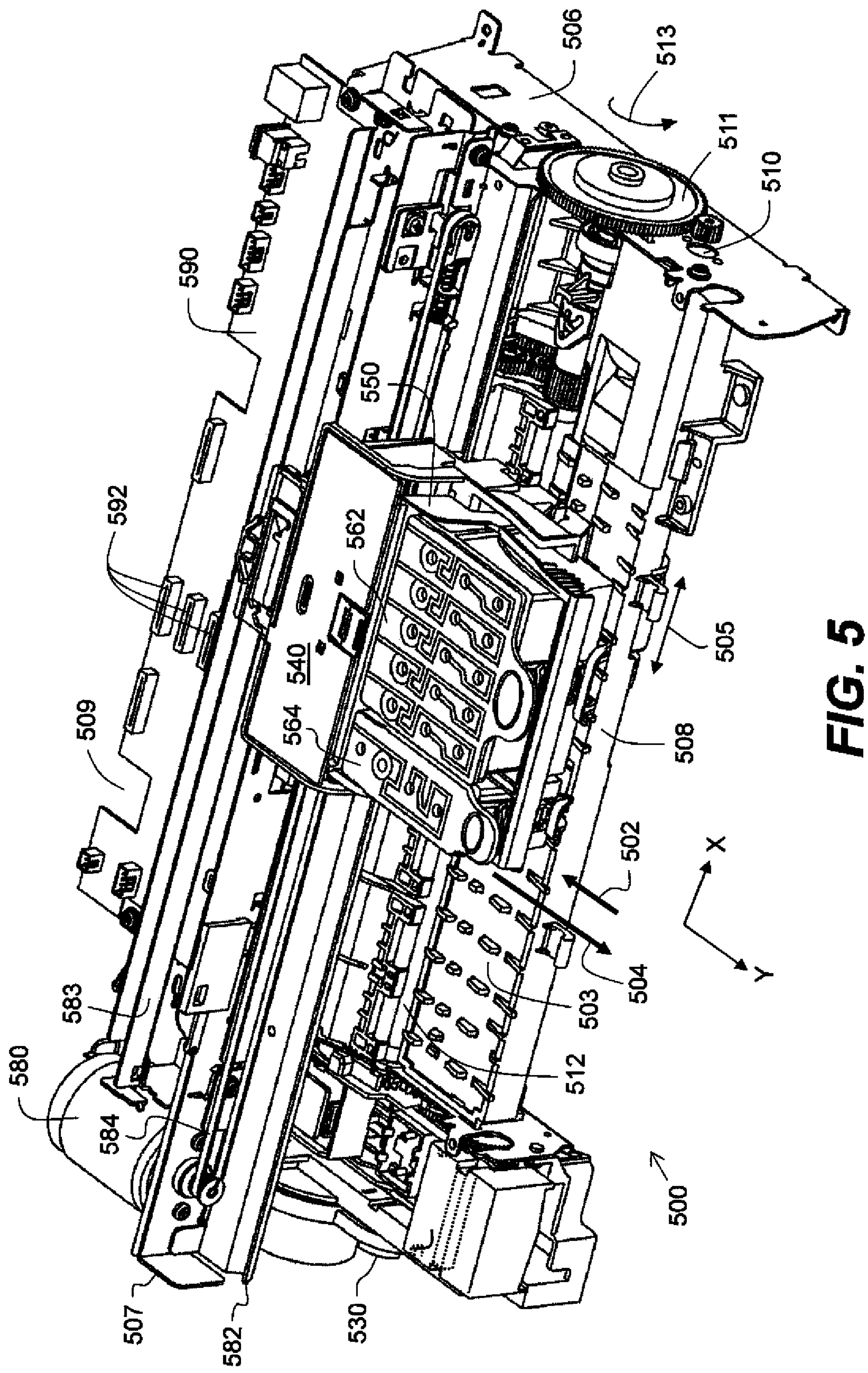
FIG. 5 is a perspective of a portion of a drop-on-demand inkjet printer.

FIG. 5 is a perspective of a portion of a drop-on-demand inkjet printer. Some of the parts of the printer have been hidden in the view shown in FIG. 5 so that other parts can be more clearly seen. Printer chassis 500 has a print region 503 across which carriage 540 is moved back and forth in carriage scan direction 505 along the X axis, between the right side 506 and left side 507 of printer chassis 500, while drops are ejected from printhead die 410 (not shown in FIG. 5) on printhead assembly 550 that is mounted on carriage 540. Carriage motor 580 moves belt 584 to move carriage 540 along carriage guide rail 582. An encoder sensor (not shown) is mounted on carriage 540 and indicates carriage location relative to an encoder fence 583.

Printhead assembly 550 is mounted in carriage 540, and multi-chamber ink tank 562 and single-chamber ink tank 564 are installed in printhead assembly 550. A printhead together with installed ink tanks is sometimes called a printhead assembly. The mounting orientation of printhead assembly 550 as shown here is such that the printhead die 410 are located at the bottom side of printhead assembly 550, the drops of ink being ejected downward onto the recording medium (not shown) in print region 503 in the view of FIG. 5. Multi-chamber ink tank 562, in this example, contains five ink sources: cyan, magenta, yellow, photo black, and colorless protective fluid; while single-chamber ink tank 564 contains the ink source for text black. In other embodiments, rather than having a multi-chamber ink tank to hold several ink sources, all ink sources are held in individual single chamber ink tanks. Paper or other recording medium (sometimes generically referred to as paper or media herein) is loaded along paper load entry direction 502 toward front 508 of printer chassis 500.

A variety of rollers can be used to advance the recording medium through the printer. In an example, a pick-up roller (not shown) moves the top piece or sheet of a stack of paper or other recording medium in a paper load entry direction. A turn roller (not shown) acts to move the paper around a C-shaped path (in cooperation with a curved rear wall surface) so that the paper is oriented to advance along media advance direction 504 from rear 509 of printer chassis 500 (in the +Y direction of the Y axis). The paper is then moved by the feed roller and one or more idler roller(s) to advance along media advance direction 504 across print region 503, and from there to a discharge roller (not shown) and star wheel(s) so that printed paper exits along the media advance direction 504. Feed roller 512 includes a feed roller shaft along its axis, and feed roller gear 511 is mounted on the feed roller shaft. Feed roller 512 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 5. Hole 510 at right side 506 of the printer chassis 500 is where the motor gear (not shown) protrudes through in order to engage feed roller gear 511 and the gear for the discharge roller (not shown). For normal paper pick-up and feeding, it is desired that the rollers rotate together in forward rotation direction 513. Maintenance station 530 is located toward left side 507 of printer chassis 500.

Toward the rear 509 of the printer chassis 500, in this example, is located the electronics board 590, which includes cable connectors 592 for communicating via cables (not shown) to the printhead carriage 540 and from there to the printhead assembly 550. Also on the electronics board are mounted motor controllers for the carriage motor 580 and for the paper advance motor, a processor or other control electronics (shown schematically as controller 404 and image processing unit 405 in FIG. 4) for controlling the printing process, and an optional connector for a cable to a host computer.

Figure 6:
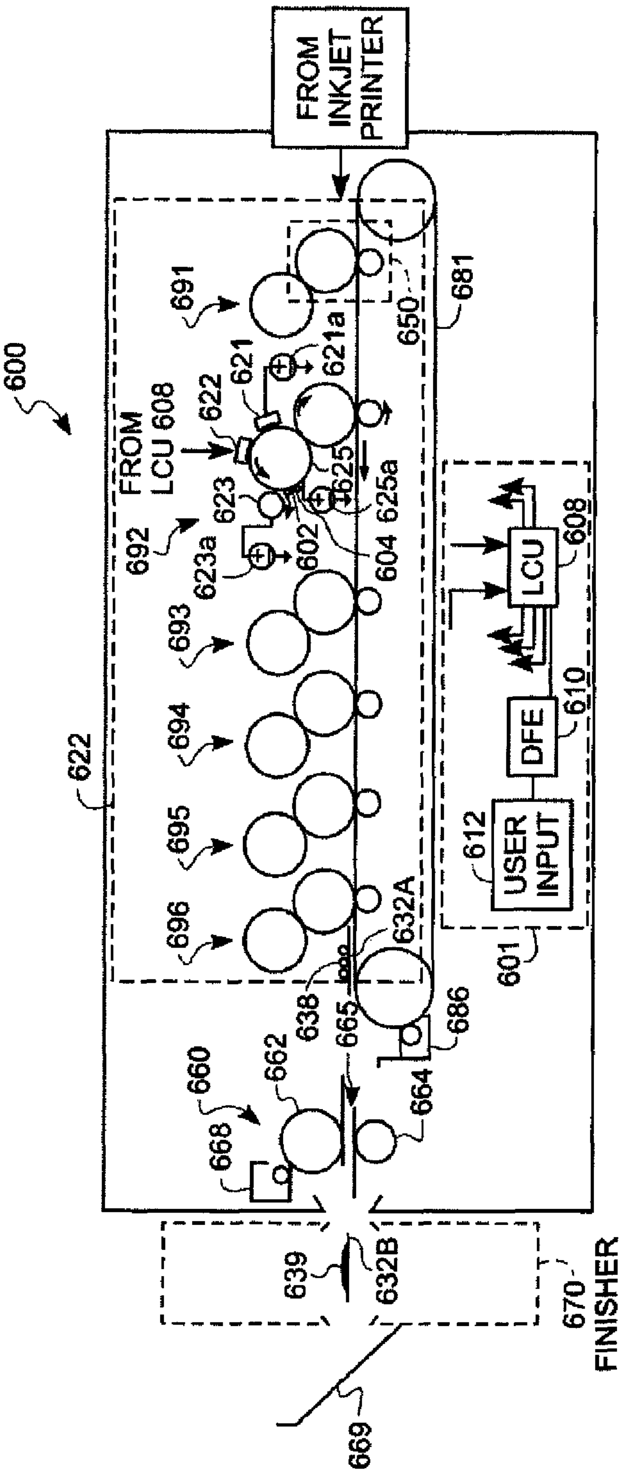
FIG. 6 is a schematic diagram of an electrophotographic printer system.

FIG. 6 is a side schematic view of an electrophotographic embodiment of a toner printer 600. However, toner printer 600 can be any device that can create a controlled pattern of particles of toner 602 on a recording medium 32 and can include printers, copiers, scanners, and facsimiles, and analog or digital devices, all of which are referred to herein as "toner printers." These can include, but are not limited to, electrostatographic printers such as electrophotographic printers that employ toner developed on an electrophotographic recording medium, and ionographic printers and copiers that do not rely upon an electrophotographic recording medium. Electrophotography and ionography are types of electrostatography (printing using electrostatic fields), which is a subset of electrography (printing using electric fields).

As is used herein, toner 602 is composed of dry toner particles 604 containing a polymeric binder such as polyester or polystyrene and may contain charge agents to impart a specific toner charge, colorants, submicrometer particulate addenda particles such as various forms of hydrophobic silica, titanium dioxide, and strontium titanate on the surface of the toner to further control toner charge, enhance flow, and decrease adhesion and cohesion. Some particles 604 of toner 602 contain a colorant. The colorant is generally a pigment but could be a dye. Toner particles used in conventional electrophotographic printers have a diameter between approximately 5 μm and 9 μm and are made by either grinding or by chemical means such as evaporative limited coalescence (ELC), as are known in the literature. However, larger sized toners in the range for example of about 12 microns to about 30 microns or large can be used. For purposes of this disclosure, unless otherwise specified, the terms toner diameter and toner size refer to the volume weighted median particle diameter, as measured using a commercial device such as a Coulter Multisizer.

Toner printer 600 has a control system 601 that, in the embodiment illustrated in FIG. 6 includes a logic control unit 608 and an optional a digital front-end processor (DFE) 610. Control system 601 controls a print engine 622 that applies particles 604 of toner 602 to recording medium 32 and a transport system that positions recording medium 32 so that print engine 622 can record at least one liquid management toner image 638 on recording medium 32.

Also illustrated in the embodiment of FIG. 6, is an optional post-printing finishing system 670 that can perform post printing operations on a recording medium 32 and that can include a UV coating system, a glosser system, a laminator system, a cutting system, a folder or a binder. Finishing system 670 can be implemented as an integral component of a printer, or as a separate machine through which prints are fed after they are printed.

Toner printer 600 can use print engine 622 to form a liquid management toner image 638 using one toner or using combinations of more than one toner. Toner printer 600 can also produce selected patterns of toner particles 604 on a recording medium 32 which patterns (e.g. surface textures) do not correspond directly to a visible image.

In operation, DFE 610 receives input electronic files (such as Postscript command files) composed of images from other input devices (e.g., a scanner, a digital camera). DFE 610 can include various function processors, e.g. a raster image processor (RIP), image positioning processor, image manipulation processor, color processor, or image storage processor. DFE 610 can rasterize input electronic files into image bitmaps for print engine 622 to print. In some embodiments, DFE 610 receives inputs from a user input system 612 from a human operator to set up parameters such as layout, font, color, media type, or post-finishing options.

Print engine 622 takes the rasterized image bitmap from DFE 610 of from LCU 608 and renders the bitmap into a form that can control the printing process from the exposure device to transferring the print image onto the recording medium. The finishing system applies features such as protection, glossing, or binding to the prints.

Control system 601 of toner printer 600 can also perform color management processes uses known characteristics of the image printing process implemented in print engine 622 (e.g. the electrophotographic process) to provide predictable color reproduction. The color management processes can also provide known color reproduction for different inputs (e.g. digital camera images or film images). LCU 608 and DFE 610 can be used to implement these processes alone or in combination.

In an embodiment of an electrophotographic modular printing machine useful with various embodiments, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a recording medium adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the recording medium. In other electrophotographic printers, each visible image is directly transferred to a recording medium to form the corresponding print image.

Electrophotographic printers having the capability to also deposit clear toner using an additional imaging module are also known. As used herein, clear toner is considered to be a color of toner, as are Cyan (C), Magenta (M), Yellow (Y), Black (K), and Light Black (Lk), but the term "colored toner" excludes clear toners.

The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. In one example of such clear toner the optical transmission density of a monolayer of clear toner after fusing can be less that about 0.05 for white light. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the recording medium and the height of a respective toner stack is the sum of the toner heights of each respective color. Uniform stack height provides the print with a more even or uniform gloss.

In the embodiment of FIG. 6, toner printer 600 has print engine 622 with a plurality of electrophotographic image-forming printing modules 691, 692, 693, 694, 695, 696, also known as electrophotographic imaging subsystems. As is shown in FIG. 6, each of the electrophotographic imaging subsystems has a print module. Each printing module produces a single-color toner image for transfer using a respective transfer subsystem 650 (for clarity, only one is labeled) to a recording medium 32 successively moved through the modules.

As will be discussed in greater detail below, recording medium 32 is supplied to toner printer 600 from inkjet printer 20 while liquid ink is on the surface of the recording medium. In various embodiments, the visible image can be transferred directly from an imaging roller to a recording medium, or from an imaging roller to one or more transfer roller(s) or belt(s) in sequence in transfer subsystem 650, and thence to recording medium 32. Recording medium 32 is, for example, a selected section of a web of, or a cut sheet of, planar media such as paper or transparency film.

Each printing module 691, 692, 693, 694, 695, 696 includes various components. For clarity, these are only shown printing module 692. Around photoreceptor 625 are arranged, ordered by the direction of rotation of photoreceptor 625, charger 621, exposure subsystem 622, and toning station 623.

In the electrophotographic process, an electrostatic latent image is formed on photoreceptor 625 by uniformly charging photoreceptor 625 and then discharging selected areas of the uniform charge to yield an electrostatic charge pattern corresponding to the desired image (a "latent image"). Charger 621 produces a uniform electrostatic charge on photoreceptor 625 or its surface. Exposure subsystem 622 selectively image-wise discharges photoreceptor 625 to produce a latent image.

Exposure subsystem 622 can include a laser and raster optical scanner (ROS), one or more LEDs, or a linear LED array.

After the latent image is formed, charged toner particles are brought into the vicinity of photoreceptor 625 by toning station 623 and are attracted to the latent image to develop the latent image into a visible image. Note that the visible image may not be visible to the naked eye depending on the composition of the toner particles (e.g. clear toner). Toning station 623 can also be referred to as a development station. Toner can be applied to either the charged or discharged parts of the latent image.

After the latent image is developed into a visible image on the photoreceptor, a suitable recording medium is brought into juxtaposition with the visible image. In transfer subsystem 650, a suitable electric field is applied to transfer the toner particles of the visible image to the recording medium to form a toner image on the recording medium. The imaging process is typically repeated many times with reusable photoreceptors.

Recording medium 32 is then removed from operative association with the photoreceptor and is heated or heated under pressure to permanently fix ("fuse") the toner image 638 to recording medium 32. Plural toner images, e.g. of separations of different colors, are overlaid on one recording medium before fusing to form a multi-color print image on recording medium 32 where desired.

Each recording medium 32, can have transferred in registration any number of toner images during a single pass through the six modules. That is, a toner image 638 can have a toner from any of one or more of the modules in print engine 622 applied in registration to form a multi-toner image. This can be used for example, to form a toner image 638 having colors or toner combinations that form different colors of the toners combined at that location. In an embodiment, printing module 691 forms black (K) print images, printing module 692 forms yellow (Y) print images, printing module 693 forms magenta (M) print images, printing module 694 forms cyan (C) print images, printing module 695 forms light-black (Lk) images, and printing module 696 forms clear images.

In various embodiments, printing module 696 forms a print image using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Recording medium 632A is shown after passing through printing module 696. Toner image 638 on recording medium 632A includes unfused toner particles.

Subsequent to transfer of the respective print images, overlaid in registration, one from each of the respective printing modules 691, 692, 693, 694, 695, 696, recording medium 632A is advanced to a fuser 660, i.e. a fusing or fixing assembly, to fuse toner image 638 to recording medium 632A. Transport web 681 transports the toner-image carrying recording media to fuser 660, which fixes the toner particles to the respective recording media by the application of heat and pressure. The recording media are serially de-tacked from transport web 681 to permit them to feed cleanly into fuser 660. Transport web 681 is then reconditioned for reuse at cleaning station 686 by cleaning and neutralizing the charges on the opposed surfaces of the transport web 681. A mechanical cleaning station (not shown) for scraping or vacuuming toner off transport web 681 can also be used independently or with cleaning station 686. The mechanical cleaning station can be disposed along transport web 681 before or after cleaning station 686 in the direction of rotation of transport web 681.

In the embodiment of FIG. 6 fuser 660 includes a heated fusing roller 662 and an opposing pressure roller 664 that form a fusing nip 665 therebetween. In one embodiment, fuser 660 also includes a release fluid application substation 668 that applies release fluid, e.g. silicone oil, to fusing roller 662. Alternatively, wax-containing toner can be used without applying release fluid to fusing roller 662. Fusing is generally accomplished by subjecting the toner image to heat and pressure that raises the temperature of the toner to a temperature above $T_g$ so that the toner is forced to flow together. Some toners known as fast melting toners contain semicrystalline binders that melt upon absorbing sufficient heat rather than just "softening" i.e. having a rapid reduction of Young's modulus as an amorphous material goes through its glass transition temperature.

Heat to melt fast melting toners can be obtained from a variety of sources, most often noncontacting sources including microwave, infrared, RF, or thermal absorption. Such toners would not be suitable for aspects of the present invention that require toners to tack or sinter rather than fully flow, as occurs in fusing. This is because, if the toner polymer binder melts, substantial flow of the binder will occur, thereby precluding sintering or tacking.

Other embodiments of fusers, both contact and non-contact, can be employed with various embodiments. For example, solvent fixing uses solvents to soften the toner particles so they bond with the recording medium. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the recording media (primarily), thereby causing the toner particles to melt by heat conduction, so that the toner is fixed to the recording medium.

The recording media (e.g. recording medium 632B) carrying the print image (e.g., print image 639) are transported in a series from the fuser 660 along a path either to a remote output tray 669, or back to printing modules 691, 692, 693, 694, 695, 696 to create an image on the backside of the recording medium, i.e. to form a duplex print. Recording media can also be transported to any suitable output accessory. For example, an auxiliary fuser or glossing assembly can provide a clear-toner overcoat. Toner printer 600 can also include multiple fusers 660 to support applications such as overprinting, as known in the art.

In various embodiments, between fuser 660 and output tray 669, recording medium 632B passes through finisher 670. Finisher 670 performs various media-handling operations, such as folding, stapling, saddle-stitching, collating, and binding as instructed by control system 601.

In the embodiment shown in FIG. 6, toner printer 600 includes logic and control unit (LCU) 608, which receives input signals from the various sensors associated with toner printer 600 and sends control signals to the components of printer 600. LCU 608 can include a microprocessor incorporating suitable look-up tables and control software executable by the LCU 608. It can also include a field-programmable gate array (FPGA), programmable logic device (PLD), microcontroller, or other digital control system. LCU 608 can include memory for storing control software and data. Sensors associated with the fusing assembly provide appropriate signals to the LCU 608. In response to the sensors, LCU 608 issues command and control signals that adjust the heat or pressure within fusing nip 665 and other operating parameters of fuser 660 for recording media. This permits toner printer 600 to print on recording media of various thicknesses and surface finishes, such as glossy or matte.

In printer 600, control system 601 can perform raster image processing (RIP) on image data that is included in a print order. The RIP can include a color separation screen generation and can result in color separation print data. Such color separation print data can be stored in data storage system 740 which can include frame or line buffers for transmission of the color separation print data to each of respective LED writers, e.g. for black (K), yellow (Y), magenta (M), cyan (C), and red (R), respectively. The RIP or color separation screen generation can be performed at toner printer 600 or elsewhere. Image data that is raster image processed can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 691) can be adjustable. In an embodiment, charger 621 is a corona charger including a grid between the corona wires (not shown) and photoreceptor 625. Voltage source **621*a* applies a voltage to the grid to control charging of photoreceptor 625. In an embodiment, a voltage bias is applied to toning station 623 by voltage source 623*a* to control the electric field, and thus the rate of toner transfer, from toning station 623 to photoreceptor 625. In an embodiment, a voltage is applied to a conductive base layer of photoreceptor 625 by voltage source 625*a* before development, that is, before toner is applied to photoreceptor 625 by toning station 623. The applied voltage can be zero; the base layer can be grounded. This also provides control over the rate of toner deposition during development. In an embodiment, the exposure applied by exposure subsystem 622 to photoreceptor 625 is controlled by LCU 608** to produce a latent image corresponding to the desired print image. All of these parameters can be changed, as described below.

Further details regarding toner printer 600 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

Figure 7:
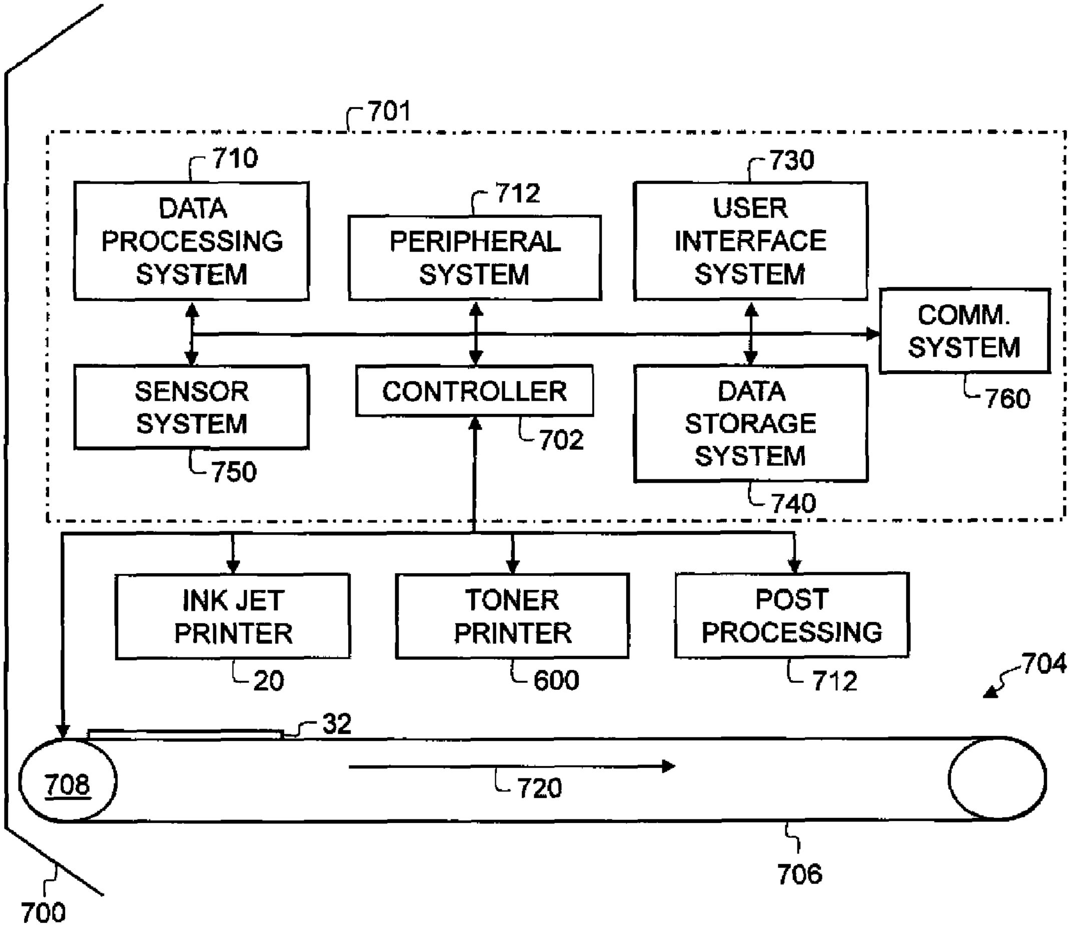
FIG. 7 shows one embodiment of an inkjet printing system.

FIG. 7 shows a system level view of one embodiment of a printing system 700 having an inkjet printer 20, and a toner printer 600. As is shown in FIG. 7, printing system 700 has a control system 701 that controls and integrates operation of inkjet printer 20 and toner printer 600 and a transport system 704 shown here as an endless belt 706 that connects inkjet printer 20 and toner printer 600.

In operation, control system 701 causes an actuator or motor 708 in transport system 704 to move endless belt 706 so as to advance surface shown here as a recording medium 32 in a printing direction 720 past inkjet printer 20 and toner printer

600. Although shown as a single endless belt 706 in FIG. 7, it will be appreciated that in other embodiments transport system 704 can comprise any type of system that can move a recording medium 32 from inkjet printer 20 to toner printer 600 in a manner that allows ink jet printer 20 to form an inkjet image and that allows toner printer 600 to transfer a toner image onto recording medium 32 before inkjet ink 40 in the inkjet image on recording medium 32 is caused to move from the location at which it was printed. As is also shown in FIG. 7, transport system 704 also provides a mechanism for moving recording medium 32 past an optional finishing system 714. Optional finishing system 714 can include but is not limited to cutting, folding, binding, glossing, drying, and fusing systems.

Control system 701 has a controller 702 that communicates with a data processing system 710, a peripheral system 712, a user interface system 730, and a data storage system 740, a sensor system 750 and a communication system 760. Peripheral system 712, user interface system 730 and data storage system 740 are communicatively connected to data processing system 710.

Data processing system 710 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Peripheral system 712 can include one or more devices configured to provide digital content records to controller 702 and to data processing system 710. For example, peripheral system 820 can include digital still cameras, digital video cameras, cellular phones, or other data processors. Data processing system 710, upon receipt of digital content records from a device in peripheral system 712, can store such digital content records in data storage system 740. Peripheral system 712 can also include a printer interface for causing a printer to produce output corresponding to digital content records stored in data storage system 740 or produced by data processing system 710.

User interface system 730 can include a mouse, a keyboard, another computer, or any device or combination of devices from which data is input to data processing system 710. In this regard, although peripheral system 712 is shown separately from user interface system 730, peripheral system 712 can be included as part of user interface system 730.

User interface system 730 also can include a display device, a processor-accessible memory, or any device or combination of devices to which data is output by data processing system 710. In this regard, if user interface system 730 includes a processor-accessible memory, such memory can be part of data storage system 740 even though user interface system 730 and data storage system 740 are shown separately in FIG. 7.

Data storage system 740 includes one or more processor-accessible memories configured to store information, including the information needed to execute the processes of the various embodiments, including the example processes described herein.

Data storage system 740 can be a distributed processor-accessible memory system including multiple processor-accessible memories communicatively connected to data processing system 710 via a plurality of computers or devices.

On the other hand, data storage system 740 need not be a distributed processor-accessible memory system and, consequently, can include one or more processor-accessible memories located within a single data processor or device. The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, solid state or semi-conductor Read Only Memory (ROM), and solid state or semi-conductor Random Access Memory.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 740 is shown separately from data processing system 710, one skilled in the art will appreciate that data storage system 740 can be stored completely or partially within data processing system 710. Further in this regard, although peripheral system 712 and user interface system 730 are shown separately from data processing system 710, one skilled in the art will appreciate that one or both of such systems can be stored completely or partially within data processing system 710.

As will be described in greater detail below data processing system 710 is used to receive signals that define what image is to be printed and on what receiver the image is to be printed. Further, data processing system 710 is used to help convert image information into image information. In particular, data processing system 710 can include a dedicated image processor or raster image processor (RIP; not shown), which can include a color separation screen generator or generators or a general purpose processor that is adapted to perform raster image processing and other processing described herein.

Control system 701 is illustrated as being apart from inkjet printer 20 and toner printer 600. However, this is for the purpose of illustration only and it will be understood that in general, any components of control system 701 or any functions that are described as being performed by control system 701 can be located in or performed by components that are located in whole or in part in control system 21 or 401 of the embodiments of inkjet printer 20 described herein or in control system of toner printer 600 or in other process and control devices normally used therewith such as a digital front end or a print server.

For example, in one embodiment, toner printer 600 can comprise a modular attachment for inkjet printer 20 that and control system 701 can be found largely within control system 21 of located in inkjet printer 100. In such an embodiment, system costs can be reduced through the use of control system electronics such as control system 21 or control system 401 that are already available in the inkjet printer 20. In an alternate embodiment, toner printer 600 can be fully capable of performing control and printing functions for inkjet printer 20 so that inkjet printing functionality can be integrated into extant toner printing systems. In one embodiment of this type, such inkjet printing functionality can be inserted into a tandem print module location in a toner printer so as to allow at least one inkjet printing operation to be performed in close proximity to a toner printing operation.

In still other embodiments, overall systems costs and complexities can be reduced through the use of a system controller 20 that performs control functions for both inkjet printer 20 and toner printer 600. In a further embodiment, both inkjet printer 20 and toner printer 600 can be stand alone devices that can directly cooperate to print as described herein such that the functions of control system 701 are shared between control systems and circuits in the individual devices. It will be understood that further variations are possible and that as used herein control system 701 includes any automatic processing circuit, system or structure that can be used to cause an inkjet printer 20 or a toner printer 600 to perform the functions that are claimed.

Figure 8:
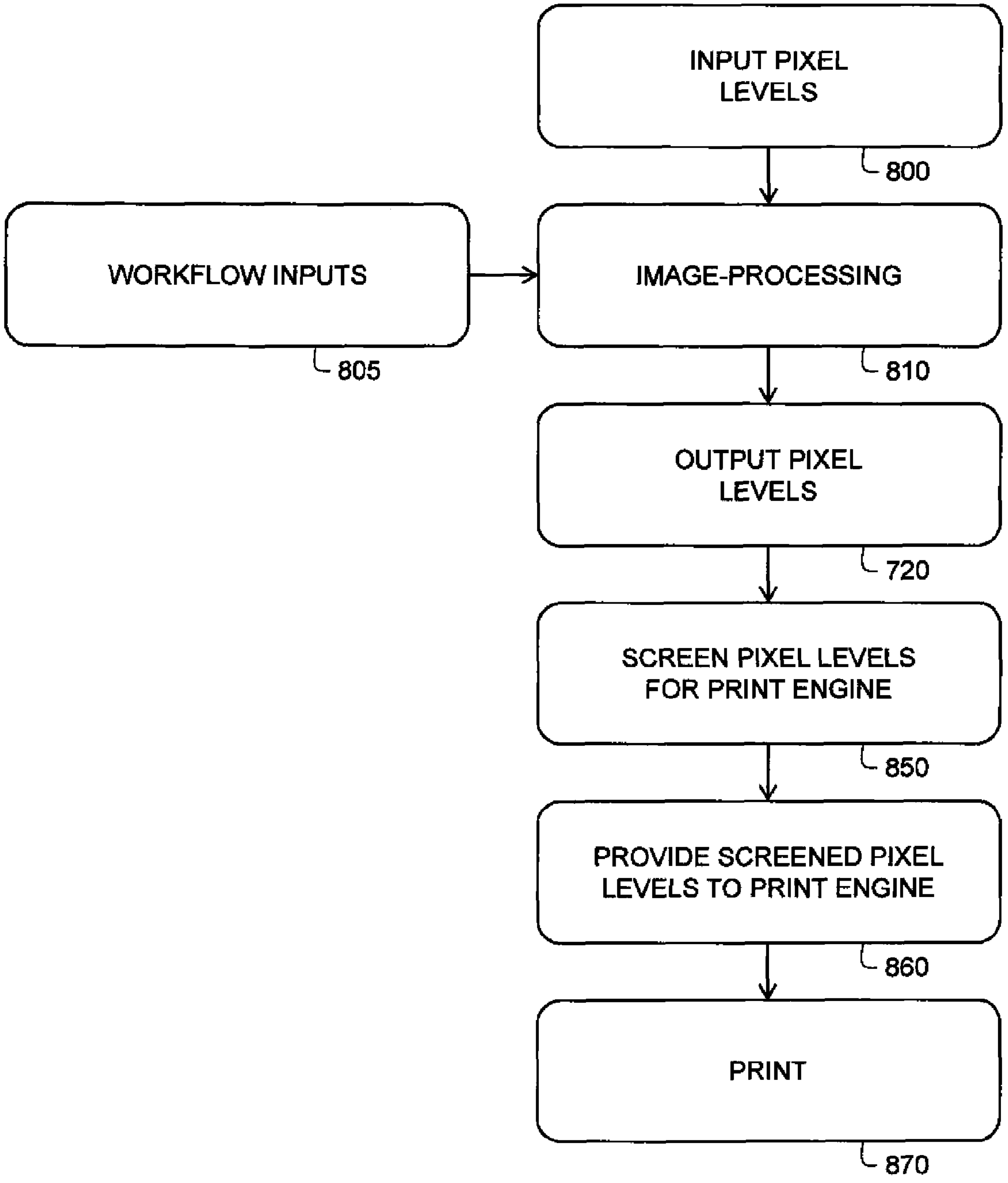
FIG. 8 is a schematic of a data-processing path useful with various embodiments.

FIG. 8 illustrates one embodiment of an image-processing path 810 that can be executed by c transforms input pixel levels 900 of input color channels (e.g. R) in an input color space (e.g. sRGB) to output pixel levels 720 of output color channels (e.g. C) in an output color space (e.g. CMYK). In various embodiments, image-processing is used 810 to transform input pixel levels 800 to desired CIELAB (CIE 1976 L*a*b*; CIE Pub. 15:2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing 810 can include optional workflow inputs 805, e.g. ICC profiles of the image and the printer 600 or other information provided by a workflow process to calculate the output pixel levels 820. RGB can be converted to CMYK according to the Specifications for Web Offset Publications (SWOP; ANSI CGATS TR001 and CGATS 6), Euroscale (ISO 2846-1:2006 and ISO 12647), or other CMYK standards.

Input pixels are associated with an input resolution in pixels per inch (ippi, input pixels per inch), and output pixels with an output resolution (oppi). Image-processing 810 scales or crops the image, e.g. using bicubic interpolation, to change resolutions when ippi≠oppi. The following steps in the path (output pixel levels 820, screened pixel levels 850) are preferably also performed at oppi, but each can be a different resolution, with suitable scaling or cropping operations between them.

Screening 850 calculates screened pixel levels from output pixel levels 720. Screening unit 850 can perform continuous-tone (processing), halftone, multitone, or multi-level halftone processing, and can include a screening memory or dither bitmaps. Screened pixel levels are at the bit depth required by either inkjet printer 20 or toner printer 600 and are transferred thereto 860 and used for printing 870.

The screened pixel levels and locations can be the engine pixel levels and locations, or additional processing can be performed to transform the screened pixel levels and locations into the engine pixel levels and locations that are appropriate for use in printing by for example, an embodiment of inkjet printer 20 with a continuous inkjet printing system 39, an embodiment of inkjet printer 20 with drop-on-demand inkjet printing system 400 or toner printer 600.

Figure 9:
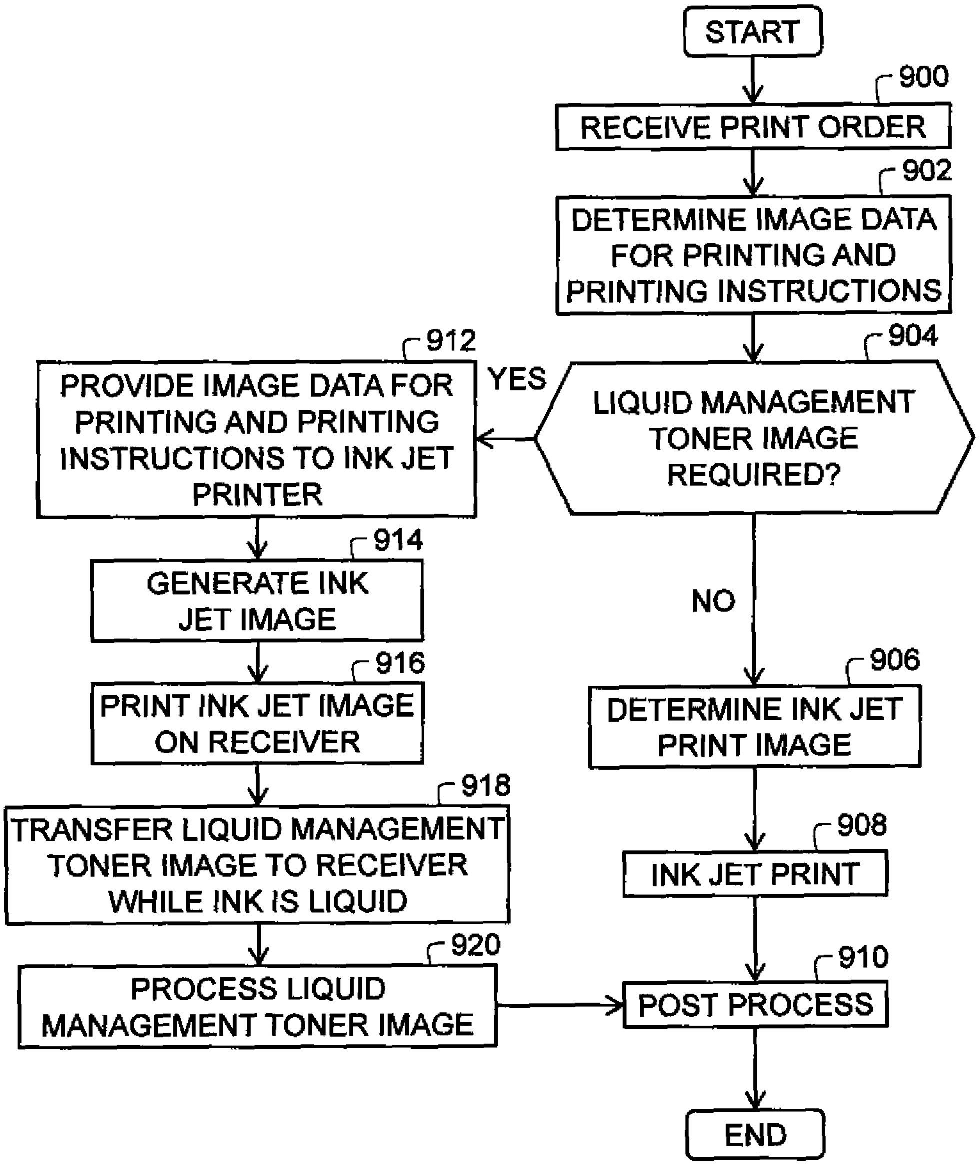
FIG. 9 shows one embodiment of a method for operating a printing system.

FIG. 9 shows an embodiment of a method for inkjet printing on semi-absorbent and non-absorbent media such as a recording medium 32 and that can be used for example with the embodiment of printing system 700 shown in FIG. 7. In the embodiment of FIG. 9 printing begins when a print order is received (step 900) and control system 701 uses the print order to obtain image information and production information (step 902). The image information can include any type of information that can be used by control system 701 to obtain, recreate, generate or otherwise determine image information for use in printing and the image information can comprise any type of information that can be used to form any pattern that can be made using inkjet printer 20. The production information can include printing information that can be used to determine what recording medium 32 the inkjet print is to be printed on. The production information can also optionally indicate how the image information is to be printed and can provide finishing information that defines how the print is to be finished, and can include information for cutting, binding, glossing, sorting, stacking, collating, and otherwise making use of a print that is made according to the image information and printing information.

In one example, the print order includes image information in the form of image data such as an image data file that control system 701 can use for printing and also contains production information that provides printing instructions that control system 701 can use to determine how this image is to be formed and what recording medium 32 is to be used in the printing. In another example, the print order can comprise image information in the form of instructions or data that will allow control system 701 and communication system 760 to obtain an image data file from one or more external devices such as separate servers or storage devices (not shown). In another example, a print order can contain image information in the form of data from which printer controller 82 can generate the determined image for example from an algorithm or other mathematical or other formula. In another example, the image information can include image data from separate data files and/or separate locations, and/or other types of image information. These examples are not limiting and a print order can be received and image information and production information can be obtained using the print order in any other known manner.

It is then determined whether the print order requires printing of an inkjet image and a toner image for the management of liquids on the recording medium 32 (step 904). This involves determining whether recording medium 32 is classified as porous or of a semi-absorbent type. In general, the term semi-absorbent is used to mean that the recording medium 32 upon which a droplet of water, alcohol or other liquid comparable in size to that used in measuring the surface energy of a surface using a contact angle goniometer is deposited onto a surface and, after 2 seconds an unabsorbed volume of ink from the drop is still visible through the optics of the contact angle goniometer. A porous receiver is defined as a receiver upon which a droplet of water comparable in size to that used in measuring the surface energy of a surface using a contact angle goniometer is deposited onto a surface and, after 2 seconds none of the droplet is still visible through the optics of the contact angle goniometer. Examples of semi-absorbent receivers include clay coated papers such as Potlatch Vintage Gloss, Warren Lustro Offset Enamel, Kromekote, and Potlatch Vintage Velvet papers. Nonporous receivers include synthetic papers such as Teslin and papers coated with impervious layers such as polyethylene or polypropylene that are commonly used for wet photographic processing. Porous receivers include common xerographic and inkjet bond papers as well as photographic papers used to print digital photographs using an inkjet printer.

Control system 701 can make this determination in any of a number of different ways. For example, in some cases this determination can be made based upon data that is in the print order or that can be obtained based upon the print order. For example, a print order can have production information including printing instructions that indicate that a recording medium 32 to be used in printing is of the porous or semi-absorbent type. In this embodiment, testing or other analysis of particular recording mediums 32 ahead of the printing operation can be used to determine whether a range of liquid volumes that inkjet printer 20 may be print by inkjet printer 20 to form an inkjet image may have unintended effects on recording medium 32 such as smearing, streaking, pooling and offsetting, and contaminating printing system 700 or other recording mediums.

Alternatively, control system 701 can determine that a recording medium 32 is porous or non-porous type based upon characteristics of recording medium 32 that will allow an assignment of a type. For example, characteristics of a recording medium 32 can be determined based upon whether the recording medium 32 is a plain paper, a coated paper, a clay filled paper, a synthetic recording medium or any other type of recording medium and whether recording medium 32 has been pre-coated for use with inkjet inks. Additional information such as a thickness of recording medium 32, a density of the recording medium, a surface roughness of the recording medium 32 and the like can also be used to influence such a determination. Here too, sensor system 750 can include scanners, scales, thickness measurement devices and the like that can automatically sense such information and provide this information to control system 701 or an operator of printing system 700 can provide such information using user interface system 730.

In general, any data that can be used to determine or to estimate whether a recording medium 32 is of the porous or non-porous type can inform such a determination. The information that can be used to make this determination can take any of a wide range of forms and can be an characterized in any of a number of different ways such as a rate at which a volume of a liquid applied to recording medium 32 will be absorbed by recording medium 32 or a capacity of recording medium 32 to absorb liquids within a period of time. Such information can for example and without limitation take the form of absorption coefficients, data or, estimates recording medium type identifiers, and any other information that may be of use in determining the type of recording medium 32.

Such data can be associated with recording medium 32 on the basis of a recording medium identification, such as a recording medium part number, a recording medium lot number or other information identifying recording medium 32 to be used in printing. In circumstances where the recording medium 32 is associated with identification information that can readily be used for tracking for example, using radio frequency identification transponders, bar codes, steganographic or other difficult to detect markings, or any other known system for encoding identification data that can be used to encode the identifying information read by sensors such as image sensors, light detectors, radio frequency transponders and the like that can be provided in sensor system 750. Such sensed identification data can be used by control system 701 to obtain or to determine either data that indicates the absorption characteristics associated the recording medium 32 or data from which the absorption characteristics can be determined. Alternatively, this information can be read by a user and entered in using user interface system 730. Once provided, control system 701 can use the identifying information to receiver identification information obtain data from which absorbent data can be identified.

Alternatively, the type of a recording medium 32 can also be determined experimentally at printing system 700 by printing a set of prints of the determined image and automatically sensing using goniometry or other device to observer whether fluid remains on recording medium 32 using for example and without limitation goniometry or by using any other known method or mechanism for sensing absorption of a receiver. For example, a test print can be made on the recording medium so that it can be determined whether a recordings medium exhibits properties that allow classification as porous or non-absorbent recording medium. In one embodiment, control system 701 can have a sensor system 750 with a sensor in the form of a scanner or imager that can sense the presence of liquid ink in a test print at one or more points after a period of time. For example, this can be sensed using visible or non-visible wavelengths of light, such as by sensing infra-red differences between absorbed ink and unabsorbed ink, by detecting glare or gloss variations, or by sensing differences in the optical densities of absorbed ink as compared to liquid in. Such a test print can be printed in a manner that positions the test print areas where offset will not pose a problem and can be processed in other ways to prevent contamination in the printer.

Control system 701 can make any of the above described determinations and/or obtain any data from which such determinations can be made by reference to a look up tables or databases that can be stored in data storage system 740 or that are available by way of communication system 916, by use of programmatic algorithms, such as computer code and the like and by use of any other mathematical, logical, or other analytical method that can receive information regarding the print that is to be made on a recording medium 32 according to the print order and to determine that the print order is to have liquid management toner image.

In this embodiment, when control system 701 determines that inkjet prints having a liquid management toner image 638 are to be made on a surface of a absorbent recording medium 32 control system 701 uses conventional processes to determine an image data for printing at inkjet printer 20 (step 906) and print on recording medium 32. Thereafter, control system 701 moves recording medium 32 along a printing path 31 past toner printer 600, without causing a toner image to be printed thereon, on to finishing system 714 for finishing (step 910) if indicated.

Where printer controller 82 determines that an inkjet image is to be printed on a semi-absorbent type of recording medium, (step 904) control system 701 provides printing instructions and image data to inkjet printer 20 (step 912) and causes inkjet printer 20 to print an image based upon the determined image data on recording medium 32 (step 914).

Figure 10A:
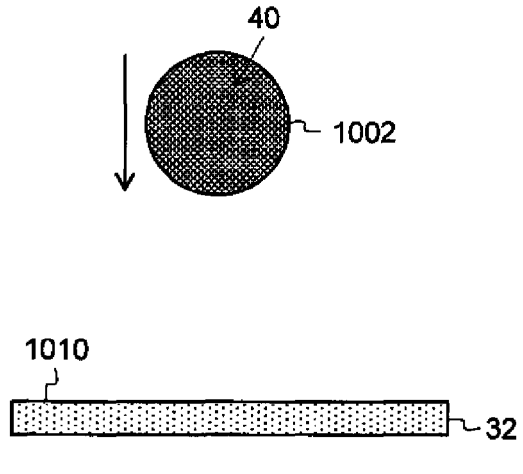
FIGS. 10A-C show various stages of an interaction between an inkjet drop and a semi-absorbent recording medium.
Figure 10D:
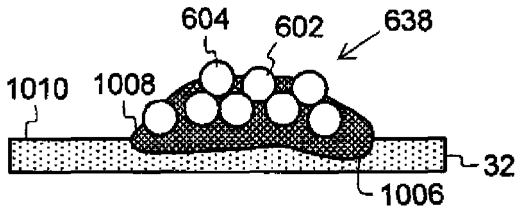
FIGS. 10D-10F show various stages of an interaction between an inkjet drop on a semi-absorbent recording medium and toner deposited on the drop.
Figure 10B:
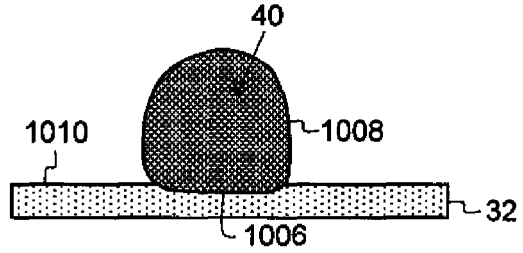
Figure 10E:
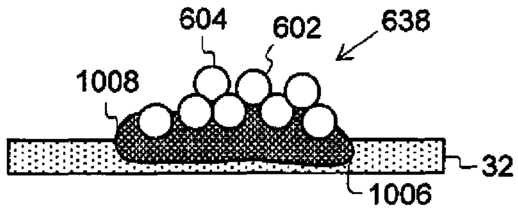
Figure 10C:
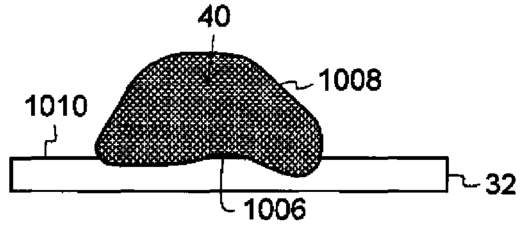

FIGS. 10A-10C show various stages of an interaction between a drop 1002 of inkjet ink 40 and a semi-absorbent recording medium 32. FIG. 10A shows drop 1002 in flight and heading toward semi-absorbent recording medium 32. As is discussed above, generally, drop 1002 will have a spherical-drop diameter of approximately 16 μm and 27 μm depending on the amount of liquid ink in drop 1002. FIG. 10B illustrates drop 1002 as drop 1002 begins to impact a surface 1010 of recording medium 32.

As shown in FIG. 10B, at impact an absorbed volume 1006 of drop 1002 of inkjet ink 40 penetrates, soaks or is otherwise absorbed into recording medium 32 carrying a functional material such as a colorant into recording medium 32 while some portion of inkjet ink drop 1002 begins to spread across a surface 1010 of recording medium 32.

As is shown in FIG. 10C, absorption of inkjet ink 40 does not occur instantaneously and after a period of time, such as two seconds after impact of drop 1002, inkjet ink 40 in drop 1002 is divided into an absorbed volume 1006 that passes through surface 1010 and an unabsorbed volume 1008 on surface 1010 of semi-absorbent recording medium 32 pending drying, absorption, or further spreading. Without intervention this unabsorbed volume 1008 will remain in liquid form for an additional period on recording medium 32 and can smear, smudge run, offset, attract and adhere contaminants, bond to subsequent receivers to create a bricking effect between otherwise non-bound recording mediums.

To prevent unintended effects from occurring when an absorbent recording medium 32 is not used, control system 701 causes recording medium 32 to be arranged with respect to toner printer 600 so that a liquid management toner image 638 can be generated (step 912) and transferred onto recording medium 32 while a portion of drop 1002 of inkjet ink 40 such as unabsorbed volume 1008 is still in liquid form on recording medium 32 (step 914). As will be discussed in greater detail below, the presence of particles 604 of toner 602 from a toner image 638 in unabsorbed volume 1008 manages liquids in unabsorbed volume 1008 of inkjet ink 40 on recording medium 32 to prevent liquid inkjet ink 40 from creating the above described problems.

Figure 10F:
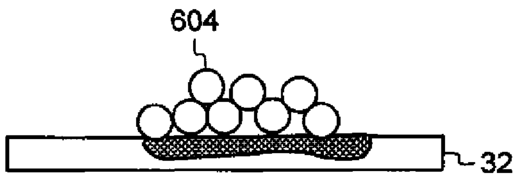

The effects of the liquid management toner image will now be described in detail with reference to FIGS. 10D-10F. As is shown in FIG. 10D, when toner particles 604 of a liquid management toner image 638 are applied to a portion of a recording medium 32 in which unabsorbed volume 1008 is in liquid form, inkjet ink 40 will be displaced by and will surround toner particles 604. Toner 602 is hydrophilic. Accordingly, when hydrophilic toner is deposited onto unabsorbed volume 1008 of ink 40, at least some of hydrophilic ink solvent is drawn into or around the toner particles 604. Toner 602 is hydrophilic if it contains components that are wettable. A wettable component is a material, such as a solid, that has a surface energy greater than 45 ergs/cm$^2$, as determined by, e.g., determining the contact angle of a compaction or fused solid of that material using diiodomethane and water, adding the polar and dispersive contributions to the surface energy, and using the Good-Girifalco approximation to estimate the interfacial energy.

In various embodiments, a toner 602 is hydrophilic where the toner binder is hydrophilic, contains or is coated or otherwise externally treated with an addendum that is a hydrophilic material. Examples of hydrophilic materials include silica, calcium oxide, calcium carbonate, magnesium oxide, or other hydrophilic ceramics and salts. Additionally, a toner 602 can be hydrophilic where the toner addenda can have diameters less than approximately 100 nm to avoid interfering with the visual characteristics of the printed image.

As is shown in FIG. 10D, one effect of the liquid management toner image 638 is that toner particles 604 project above surface 1010 of recording medium 32 and increase the surface area along which unabsorbed volume 1008 of inkjet ink 40 is exposed to the drying effects of air so that at least some of liquids in inkjet ink 40 can evaporate or otherwise dry without having to enter into recording medium 32. Similarly, this creates an increase in surface area during fusing.

Another effect of the liquid management toner image 638 is to alter the flow path and flow mechanisms of unabsorbed volume 1008 of inkjet ink 40. In particular after the introduction of toner 602, unabsorbed volume 1008 is required to flow at least in part between particles 604 of toner 602. This disrupts flow and reduces the lateral rate of movement of volume 1008 and therefore limits the extent to which problems such as streaks, smudges and runs can arise.

Figure 11:
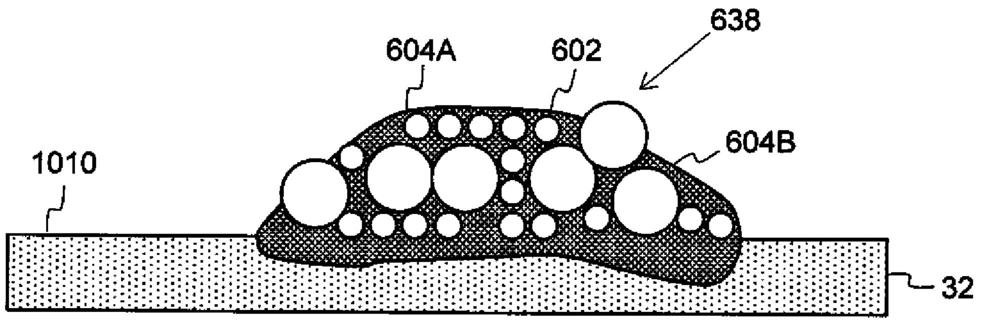
FIG. 11 illustrates a liquid management toner image having two differently sized toner particles.

The extent of the alteration of the flow of unabsorbed volume 1008 of inkjet ink 40 through a liquid management toner image 638 and the amount of additional surface area provided by particles 604 toner 602 can be enhanced in various ways. For example, as is shown in FIG. 11 a toner image 638 can be applied having more one type of toner such as a mix of differently sized toner particles 604A and 60413 can be used to increase the surface area of the liquid management toner image and to increase the complexity of flow of inkjet ink 40 toward recording medium 32. In a further example, such effects can also be enhanced by using ground toner particles 604 having rough surfaces or arrangements of surface addenda which can create rough surfaces so as to further complicate flow of inkjet inks 40 and can further increase the surface area of the toner particles 602.

In addition to altering the flow characteristics and surface area available for drying inkjet ink 40, particles 604 of toner 602 can be made from and or can be made to include hydrophilic materials that have the capacity to absorb the liquids in the inkjet ink 40. Additionally or alternatively, particles 604 of toner 602 can be made to absorb liquids by applying sub micrometer particulate addenda added to particles of toner 602 can include materials absorb liquid ink such as hydrophilic materials.

In still other embodiments, the shape of the toner particle can contribute to the flow of liquid through toner particles 604. For example, so called porous toner particles 604 can be used.

Porous toner particles 604 are toner particles that have a polymeric or other binder with voids therein. Porous toner particles 604 can be classified as either open or closed cell. For a closed cell porous toner, the majority of voids are separated from each other by the polymer binder of the toner. Closed cell toner particles 604 can offer generally at least the same fluid management advantages of as non-porous toner and can do so while requiring less binder material. Further, in cases where the surface of the closed cell toner is ground to particular sizes after fabrication, there may be open or partially open cells at the edges of the toner particles that can capture inkjet fluids and that effectively increase the surface area of such closed cell toner particles 604.

In an open cell porous toner particle 604, voids within toner particles 604 are interconnected and can be connected to the surface of the toner particle to permit surrounding air, liquids or other mediums to enter or pass through the toner particles. The presence of interconnectivity can be determined by either microtoming porous toner particles and examining in a transmission electron microscope (TEM) the cellular structure. Alternatively, BET can be used to determine whether a porous toner has an open or closed cell structure. Specifically, the surface area per unit mass of a porous toner particle 604 is greater than that of a non-porous toner particle 604 because the porous toner particle 604 is less dense. Thus, the density of a porous toner particle 604 is determined by measuring the volume of a known mass of toner and comparing that to the volume of an equivalent mass of toner of comparable size and polymer binder material. The surface area per unit mass is then measured using BET. For a closed cell porous toner, the surface area per unit mass would be approximately the same as that of the nonporous toner times the ratio of the mass densities of the nonporous and porous toners.

Thus, conceptually speaking closed cell porous toner with voids occupying half the volume of a toner particle 604 would have a mass density of half of a comparable nonporous toner and a corresponding surface area per unit mass of twice that of the nonporous toner. If the surface area per unit mass exceeds that for the surface area per unit mass that is expected from the density measurements by a factor of at least two, it is considered an open cell porous toner.

It will be appreciated that open cell toner particles 604 can advantageously provide substantially more surface area than non-porous toner and also require less binder material than conventional toners, such that less thermal energy is required to fuse such open cell toner particles. Further, it will be appreciated that open cell porous toner particles provide liquid inkjet ink 40 from unabsorbed volume 1008 a greater number of pathways along which to travel and therefore offer many more pathways for ink 40 to follow as it is drawn toward surface 1010 this can substantially slow flow of ink 40. This in turn means that there is a greater opportunity to slow the flow of ink 40 to recording medium 32.

Additionally, the open cell toner particles are allow a greater opportunity to expose ink 40 to air during this process such that drying of liquid components of the ink 40 can occur to a greater extent. Further, to the extent that such particles 604 of porous toner 602 are made from materials that absorb liquids in inkjet ink 40, or to the extent that they have absorbent coatings or addenda applied thereto, there is an increased exposure of the inkjet ink to absorbent surfaces because ink 40 is able to access surfaces inside the toner particles.

Thus, the use of a toner image 638 can help to manage flow of unabsorbed volumes 1008 of ink 40 on surface 1010 of a recording medium 32, to help to dry ink 40, or to absorb ink 40 on surface of recording medium 32 in order to prevent the problems associated with having mobile liquid ink 40 on the surface of a recording medium 32 for an extended drying period as may be required when inkjet printing is performed on a recording medium 32 that is of a semi-absorbent or non-absorbent type.

Additionally, it will be understood that because liquid management toner image 638 projects above recording medium 32, and that the upper most surfaces of toner image 638 will be the first potions of the toner image 638 to dry, toner particles 604 create a physical barrier between surfaces that may contact recording medium 32 so as to limit the extent of any offset problems or contamination problems.

It will be appreciated that it can be important that the presence of a liquid management toner image 638 does not disturb the look and feel of semi-absorbent or non-absorbent recording mediums 32 so that they closely mimic or improve upon the appearance a lithographic print made on the same recording medium 32. Accordingly, patternwise application of a liquid management toner image 638 to an inkjet image on such a recording medium 32 is particularly advantageous as toner 602 is applied where useful to manage liquid ink on the surface of a toner image, but not applied to other areas of recording medium 32. This allows the original texture, feel, gloss and other characteristics of the underlying toner image to be generally preserved outside of the areas in which liquid management toner image 638 is applied and has the effect of reducing the additional weight or cost of the printed image created by adding the toner image 638 to the print for liquid management purposes. Accordingly, control system 701 generates a toner image 638 that is determined to provide liquid management of the unabsorbed volume of inkjet ink as necessary to protect integrity of the inkjet images being printed. In a first embodiment, this can involve identifying areas of the inkjet print made on a recording medium 32 that has colors or image densities that are likely to create volumes of inkjet ink 40 that are outside of a range of inkjet ink volumes that can be used with recording medium 32 and creating a liquid management toner image 638 having toner 602 applied in such areas.

In general, control system 701 generates toner image 638 (step 914) so that liquid management toner image 638 provides toner at locations on recording medium 32 that are expected to have an unabsorbed volume 1008 of inkjet ink 40 that would, in the absence of toner 602, create the risks of pooling, smearing or otherwise creating unintended artifacts on a non-absorbent or semi-absorbent recording medium 32. This is illustrated generally, in the FIGS. 10A-10F, as liquid management toner image 638 is defined in a manner that provides at least some coverage of toner particles 604 where there is an unabsorbed volume 1008 while no toner particles are provided where there is no unabsorbed volume 1008.

However, to do this across an area of an inkjet image requires determination of volumes of inkjet ink 40 applied on a recording medium 32 and identification of those areas that have ink applied in such volumes that will create an unabsorbed volume 1008 that can create a risk of the problems described herein above or any other known problems associated with the presence of unabsorbed inkjet ink 40 on a surface of a recording medium during printing.

In one embodiment, a threshold level of ink volumes that will be printed is used and applied to the inkjet image. The threshold level can be set based upon information that characterizes either the extent to which the recording medium 32 will absorb at least some of the inkjet ink 40 applied to a surface of the recording medium 32 and a higher end of the range of the amount of inkjet ink 40 that will be applied at such a location. In some cases, a single threshold can be used for all semi-absorbent or non-absorbent recording mediums 32. In other cases different thresholds can be used based upon characteristics of the recording medium 32 and of inkjet ink 40 being used.

Additionally, the threshold level can be influenced by the printing process that is used to perform inkjet printing on recording medium 32. For example, in some cases, the ability of a recording medium 32 to absorb inkjet ink 40 will be influenced by environmental and other considerations. Accordingly, in any of the above described embodiments, control system 701 can also determine additional information regarding conditions that can influence the ability of a recording medium 32 to absorb liquids such as by sensing or otherwise determining whether the recording medium 32 has been exposed to conditions that may influence the absorption characteristics of recording medium 32. These factors can include exposure to ambient humidity, any known or anticipated preprocessing of recording medium 32 such as may occur thorough preheating or pre-drying or even post printing drying. The temperatures at the time of printing or the temperatures of the ink 40 can also be considered for this purpose.

Figure 12A:
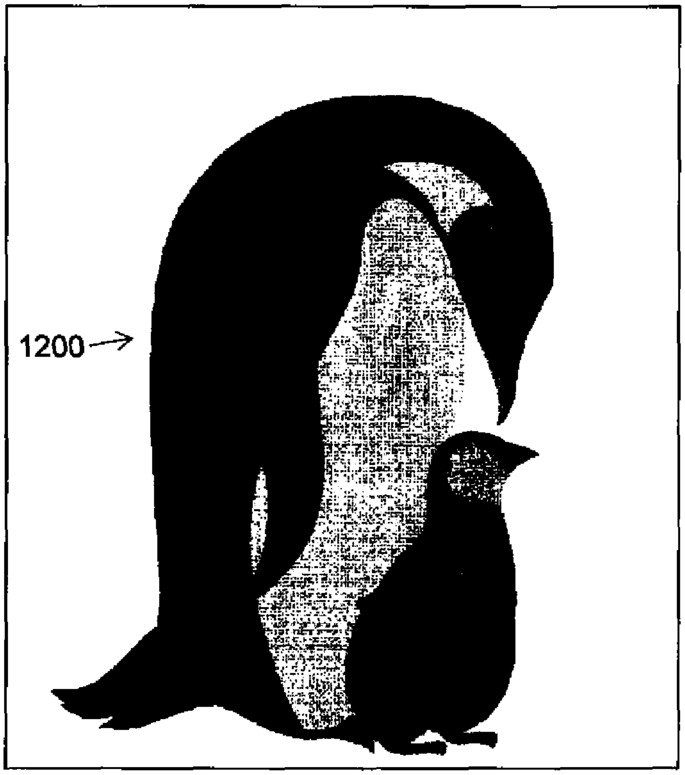
FIG. 12A illustrates an inkjet image for printing.

Once that a threshold is determined, the threshold is applied to the inkjet image to be printed to identify areas of the inkjet image at which ink will be applied in quantities that are greater than the threshold. These can be identified in a number of ways. One way in which this can be done will now be described with reference to FIGS. 12A and 12B. In the example of FIGS. 12A *and* 12B, control system 701 analyzes the image data representing the inkjet image 1200 to be printed. In this example inkjet image 1200 is in the form of a monochrome image. As this is a monochrome image, the volume of inkjet ink 40 applied to form inkjet image 1200 monotonically increases according to image density. Thus, it is possible to determine an image density threshold based upon a determined ink volume threshold. The image density threshold can then be applied to determine areas of inkjet image 1200 that will require the application of liquid management toner.

Figure 12B:
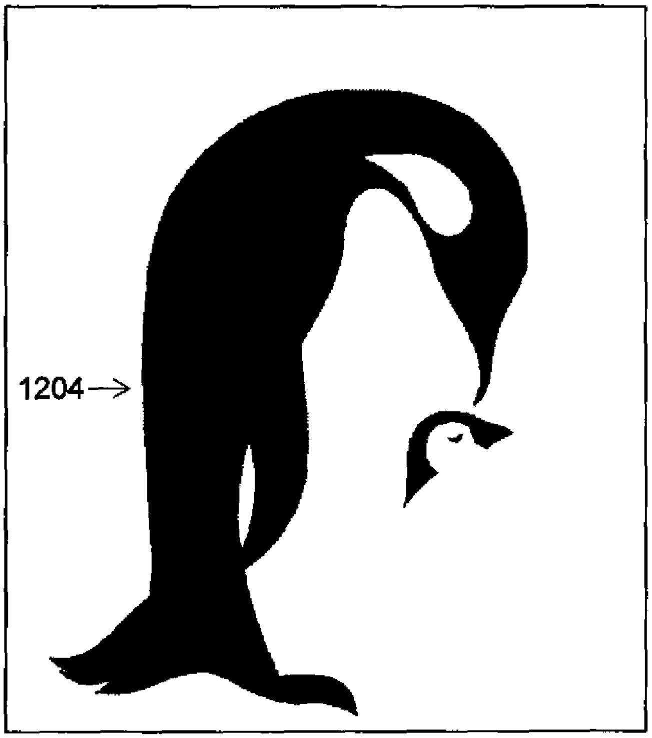
FIG. 12B illustrates an example of areas of the inkjet image of FIG. 12A that are at or above a density threshold.

FIG. 12B illustrates an example of areas 1204 of inkjet image 1200 that are at or above a density threshold. Here, these are the areas of inkjet image 1200 that are dark colored.

Figure 12C:
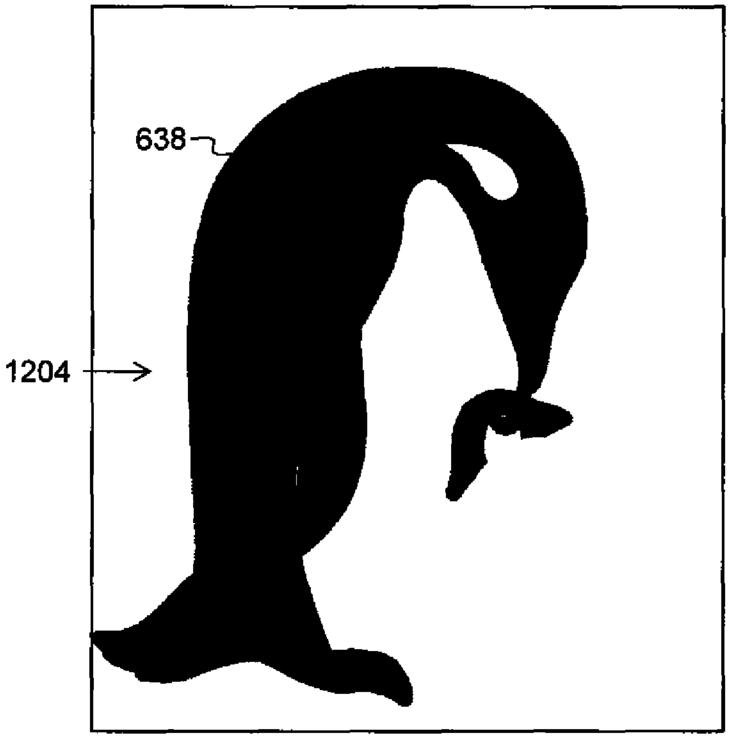
FIG. 12C illustrates a liquid management image for the areas illustrated in FIG. 12B.

After the areas of the inkjet image 1200 are identified, a toner image 638 is generated. An example of a liquid management toner image 638 generated for use with inkjet image 1200 is shown in FIG. 12C. As is shown in FIG. 12C, toner image 638 is mapped to correspond to the areas identified in FIG. 12B. However, toner image 638 is not required to correspond exactly to these areas.

In particular it will be appreciated from FIG. 12C that liquid management toner image 638 can be oversized with respect to the features of inkjet image 1200 and can at a more generalized level of resolution. Such variations are not necessary but it can be useful to allow liquid management toner image 638 to be determined more rapidly. As is also suggested by the uniform coloration of toner image 638 in FIG. 12C a generally uniform layer of toner particles 634 is applied in this embodiment. However, this is not required.

In other embodiments, more complex analyses can be performed to determine the pattern of the liquid management toner image 638. For example, in a multicolor inkjet image, liquid volumes deposited on a receiver will be based upon the amount of inkjet ink 40 applied at each location. However, in a multicolor printing system, an amount of inkjet ink 40 applied to a recording medium 32 in order to form an inkjet image does not necessarily correlate to image density in the printed inkjet image. This is because certain colors may only be achievable using combinations of amounts of a plurality of different inks without necessarily resulting in high density image elements For example, in a four color printer using cyan, magenta, yellow and black inks, it is possible to form the highest density portions of the image (those appearing black or near black) to be printed using only black ink. However areas having more complex colors that require contributions from many different types of ink may require the deposition of substantially more ink than a dark area of the print yet may not have an image density of the dark area.

Figure 13A:
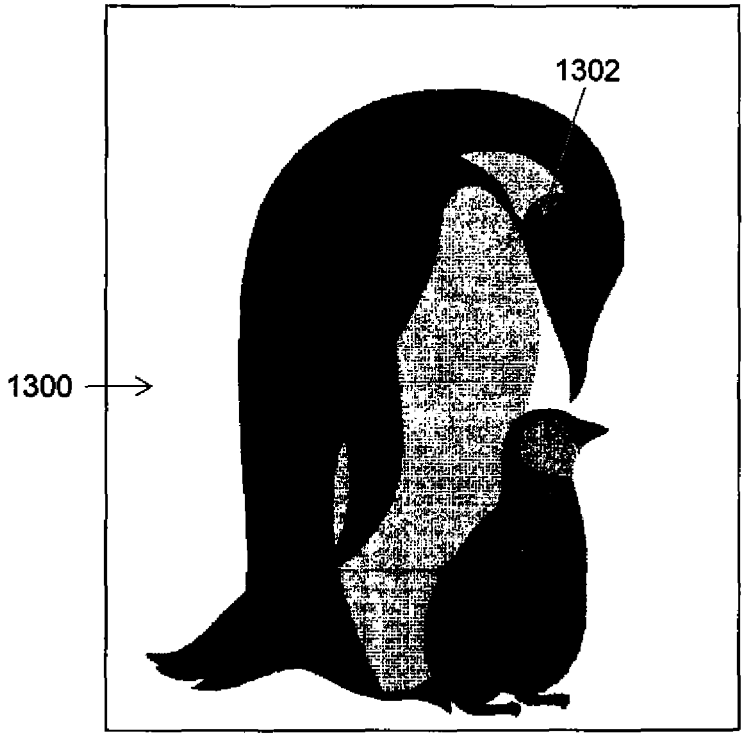
FIG. 13A illustrates an inkjet image for printing.
Figure 13B:
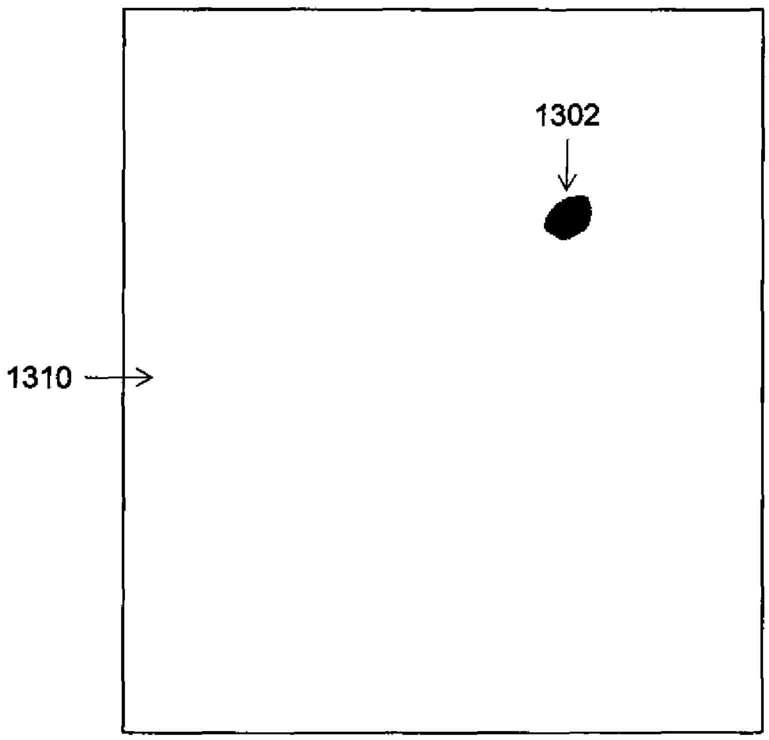
FIG. 13B illustrates an example of areas of the inkjet image of FIG. 12A that are at or above a threshold based upon all inks applied a location

FIGS. 13A and 13B illustrate an example of the application of this. FIG. 13A shows an image 1300 identical to inkjet image 1200 but now including a spot 1302 that has a complex color such as a brown or orange or gradations of the same. To form such a complex color, several different inkjet inks 40 would be applied to spot 1302. However, applying threshold density analysis described with respect to FIG. 12A therefore might identify only those areas identified in FIG. 12B as being above a threshold for ink volume. However, in a printer that uses four ink colors including a black ink black areas of in the inkjet image 1200 can be formed by a single application of black inkjet ink 40, while a more complex color such as brown will include applications of yellow, magenta, and black inkjet inks such that the total amount of inkjet ink 40 applied in spot 1302 may be greater than an amount of black ink required to form higher density areas of image 1300

Accordingly, to determine which portions of image 1300 may have higher levels of inkjet ink 40, it may be necessary to convert image data received into image data for printing such as by performing raster image processing to generate a color separation image for each color of ink to be printed and then to add the total amount of ink applied at each location to determine the amount of ink to be applied on a pixel by pixel basis.

Alternatively, the amounts of inkjet ink 40 that are printed by inkjet printer 20 in response to particular color printing instructions can be determined by information provided by a manufacturer or user of inkjet printer 20 in advance of the printing operations and data can be stored in data storage system 740 that allows control system 701 to cross reference color printing information with an amount of inkjet ink 40 that inkjet printer 20 will apply to form such colors. This data can be stored in the form of a look up table or other useful data storage structure and can be organized in the form of a conversion algorithm. Any logical method for making such determinations can be used.

Similarly, it will be appreciated that the color content of recording medium 32 if any can influence printed colors and that it may be necessary to recharacterize the combinations of inkjet inks 40 that are to be applied to this recording medium 32 to form colors having a desired appearance. This can be done, in a conventional fashion, done by using inkjet printer 20 to print a test print on recording medium 32 using a predetermined pattern of color patches, analyzing the colors actually formed in the patches such as by using a color scanner were densitometer incorporated in sensor system 750 and making calibration adjustments based upon this analysis. Where this is done, the determination as to how much inkjet ink 40 will be applied at a location of a printed multi-color image will be adjusted accordingly, for example, through the use of a conversion factor or updated look up tables or conversion algorithms.

In certain embodiments, it can be beneficial to provide more than one threshold level, with each threshold level being associated with a different amount liquid management toner being applied at each threshold. Additionally, in certain embodiments the amount of liquid management toner applied at different areas of the inkjet image can increase monotonically with the liquid volumes applied at each location.

It will be appreciated that the coverage of the liquid management toner image need not be continuous and can be patterned with different levels of coverage within an area for aesthetic reasons, liquid management reasons or, as will be discussed in greater detail below, for vapor management reasons.

In one embodiment, analysis of the inkjet image to determine amounts of ink that are to be applied to a recording medium 32 is performed on a pixel by pixel basis.

However, other techniques can be used with an area based analysis being used in small areas such as clusters of inkjet dots that will, for example, be integrated where for example they provide identical or similar color or density responses or where the frequency of changes in the image information in a region of the inkjet print are low. Similarly, the inkjet image to be printed can be analyzed according to color mapping such that ink levels within particular shape or pattern in the image can be analyzed independently or as a group and alternatively edge or pattern recognition within the inkjet image can be used to indicate where high volumes of inkjet ink will be located. Alternatively, the size of areas to be analyzed can be as small as individual picture elements or groups of picture elements.

The next step is to define a liquid management toner image 638 to be applied to recording medium 32 after inkjet printer 20 has printed the inkjet image on recording medium 32. In the example of 12C, liquid management toner image 638 has an area that corresponds to the inkjet image and applies toner at each portion of recording medium 32 at which inkjet ink 40 will be applied in volumes that are above the determined threshold for recording medium 32.

Liquid management toner image 638 is then formed by toner printer 600 and transferred onto recording medium 32 in registration with inkjet image (step 918). This transfer of the liquid management toner image 638 provides the advantages described above however, the liquid management toner image 638 is not fixed to the recording medium 32 by the transfer process. Accordingly, it is possible for some or all of toner particles 604 to separate from recording medium 32 and create image artifacts and therefore post transfer processing of liquid management toner image is required.

FIGS. 13A-13F illustrate generally the operation of the processes described herein on a non-absorbent recording medium 32. Here the use of liquid management toner image 32 is critically important to slow the rate of flow of unabsorbed volume 1008 of inkjet ink 40 across surface 1310 of non-absorbent recording medium 32.

Figures 14A, 14B, 14C, 14D, 14E:
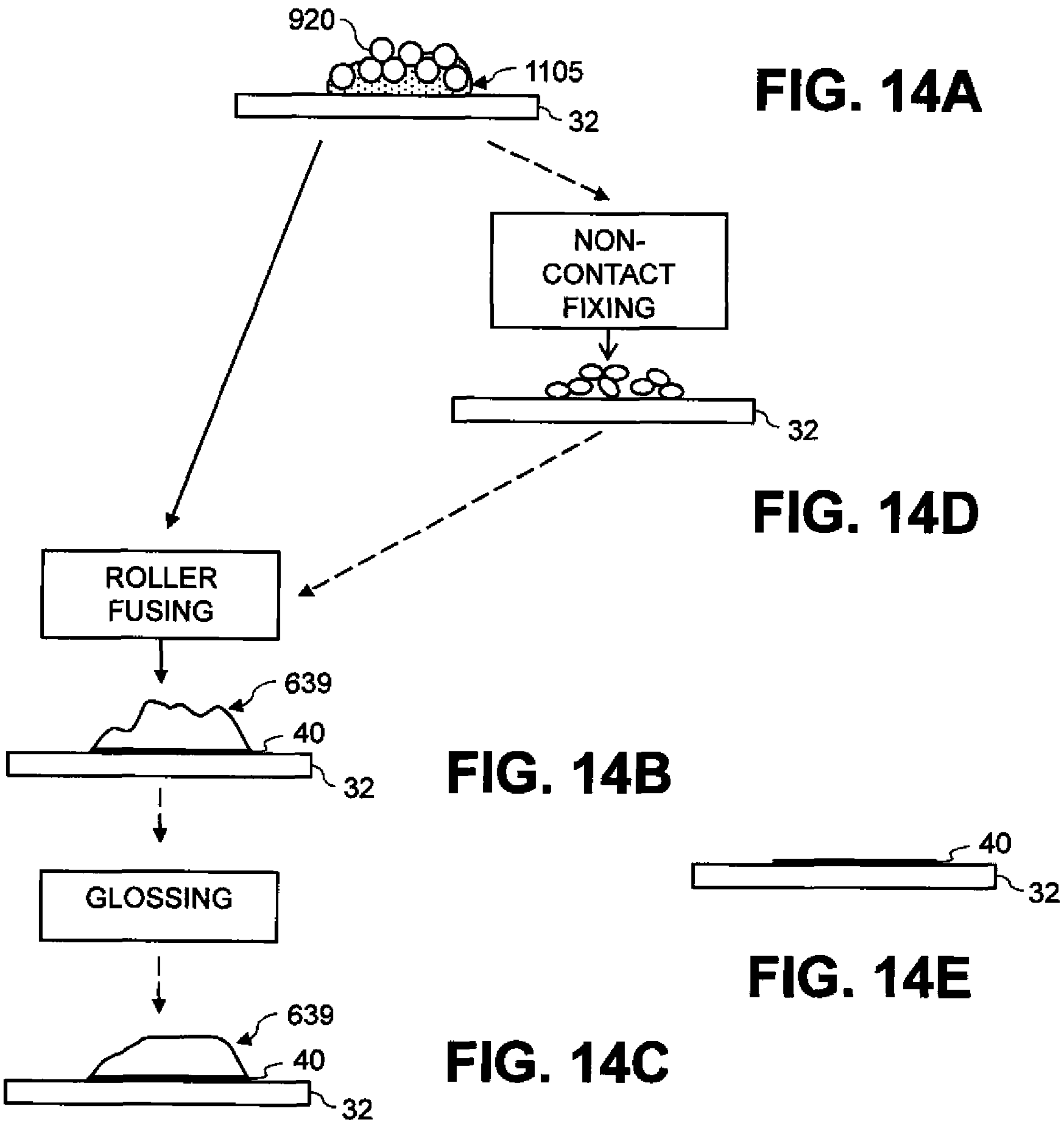
FIGS. 14A-14E illustrate a recording medium having an unabsorbed volume of ink and a liquid management toner image and example post processing steps that can be performed regarding the liquid management toner image.

FIG. 14A shows liquid management toner image 638 and recording medium 32 after transfer but before post processing. As is shown in FIGS. 14B-D, in various embodiments toner image 638 can be bound to recording medium 32 during post processing by fixing. In one embodiment, as is generally suggested in FIG. 14B this can be done using conventional roller or belt fusing which can include or be followed by a glossing operation as is suggested in FIG. 14C which can result in a fused liquid management toner image 639 in as shown in FIG. 14B and a fused and shaped toner image as is shown in FIG. 14C.

Alternatively, as is generally illustrated in FIG. 14D fusing or sintering can involve non-contact fusing or sintering. In particular, non-contact microwave fusing is particularly useful in this embodiment. This is because hydrophilic liquids such as waters and alcohols are particularly sensitive to such microwave radiation. These liquids rapidly heat, are brought to a boil and change state to a heated gas when exposed to microwaves. These liquids then heat the particles 604 of toner 602. This causes toner 602 in toner particles 604 to quickly reach a glass transition temperature at which point toner particles 604 begin to press against each other in ways that create adhesive bonds between the toner particles 604 and between toner particles 604 and recording medium 32. Depending on the extent of the heat provided and the duration, such non-contact fusing can result in sintering or full fusing of the toner particles.

It will be appreciated that the use of this fusing technique provides several advantages, first this allows noncontact fusing of the recording medium 32 which helps to protect the look and feel the recording medium 32 from unintentional modification that can occur during roller fusing, second, the interstitial spaces between toner particles allow a pathway for vapors to escape from the liquid management toner image 638 so that pressure does not build within liquid toner management and third this further helps to enhance the drying process. Where non-contact fusing does not yield a desired surface smoothness, such non-contact fusing or sintering can be used as a precursor to conventional fusing processes shown in FIGS. 14B and 14C.

Additionally, other approaches can be used to address the problems related to fusing a liquid management toner image 638 that has unabsorbed volume 1008 of a liquid inkjet ink 40 therein. In one embodiment, preheating is used in advance of fusing to reduce the amount of liquid in the toner image. This preheating can be done at a temperature that is sufficient to raise the vapor pressure of the liquid components of the inkjet ink without boiling these components. Such preheating can advantageously reduce the risks of damage cause by liquid in liquid management toner image 638 by drying, can tack the toner particles 604 and can stabilize the liquid management toner image 638 before fusing. Additionally, this increases the temperature of the toner so that less heat must be transferred during fusing further reducing the risk that vapor pressure within liquid management toner image 638 will disrupt the liquid management toner image.

In an embodiment, the vapor pressure issue can comprise an additional consideration in determining a toner pattern for a liquid management toner image, in that the liquid management toner image can be defined in a manner that provides avenues for the release of vapor during fusing.

In this regard, an optional drying step can reduce the amount of liquid present in the liquid management toner image 638 and can warm the particles of toner 602 closer to the glass transition temperature of the toner 602 prior to fusing. The heat supplied in such drying can also reduce the possibility that during post processing fusing or sintering the hydrophilic liquid ink hat has soaked into the surface of the recording medium 32 can be brought to a boil. If this happens too quickly for the resulting gas to escape from recording medium 32 gradually, the resulting internal pressure in the recording medium 32 can puncture part of a thickness of recording medium 32 to permit the gas to leave the paper. This can form a blister in recording medium 32 that can reduce image quality. This optional drying can be performed before fusing, fixing, or sintering and doing so at a lower thermal flux than used for fixing, permits the gas to escape the paper gradually rather than by mechanical explosion. This reduces the formation of blisters in recording medium 32 and also limits the risk that liquid management toner image 638 may be damaged or altered as the inkjet image is heated.

As is generally illustrated in FIG. 14E, liquid management toner image 638 can simply be removed from recording medium 32 after liquid management toner image 638 has performed the liquid management functions that are required of it leaving behind the dried remains of inkjet ink 40. The removal of toner particles 604 forming liquid management toner image 638 can be done mechanically, or using electrostatic, sonic, vacuum or gravity forces as desired.

Liquid Management Toner Image To Reduce Receiver Distortion

In various embodiments described above, a liquid management toner image has been described being used for preventing unabsorbed inkjet ink from creating unwanted artifacts on a recording medium 32 (also referred to herein as a receiver). However, a liquid management toner image 638 can manage liquids for other uses. In the following sections the use of a liquid management toner image 638 will be described for the purpose of controlling non-uniform distortion that can occur in a printed image.

In many cases, such non-uniform distortions can be deleterious resulting in image artifacts such as localized paper cockle, local loss of density, local loss of image resolution and other image artifacts. Such distortions are non-uniform and may occur in one dimension, two dimensions or three dimensions and cannot be predicted apriori. Moreover these distortions do not simply result in a magnification error or a registration error which can generally be corrected using known techniques, such as use of fiducial or scaling of digital files. Alternatively, the distortions can create desirable effects. For example, one may want a controllable three dimensional relief map of the type that are used in making topographical maps. Accordingly as used herein the concept of controlling non-uniform distortion includes the ideas of using a liquid management toner image to prevent, limit or even strategically enhance the extent of the distortions.

Figure 15A:
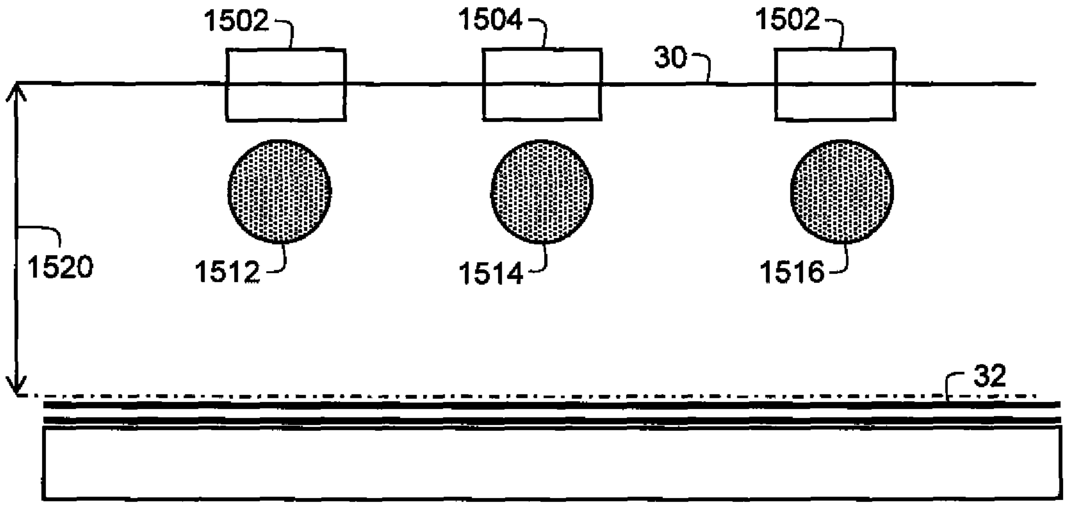
FIGS. 15A-15C illustrate non-uniform distortions created by ink on a receiver.

FIG. 15A shows a first example of inkjet printhead 30 having an array of nozzles shown here as nozzles 1502, 1504 and 1506 each ejecting a drop 1512, 1514 and 1516 of inkjet ink across a printing distance 1520.

Figure 15B:
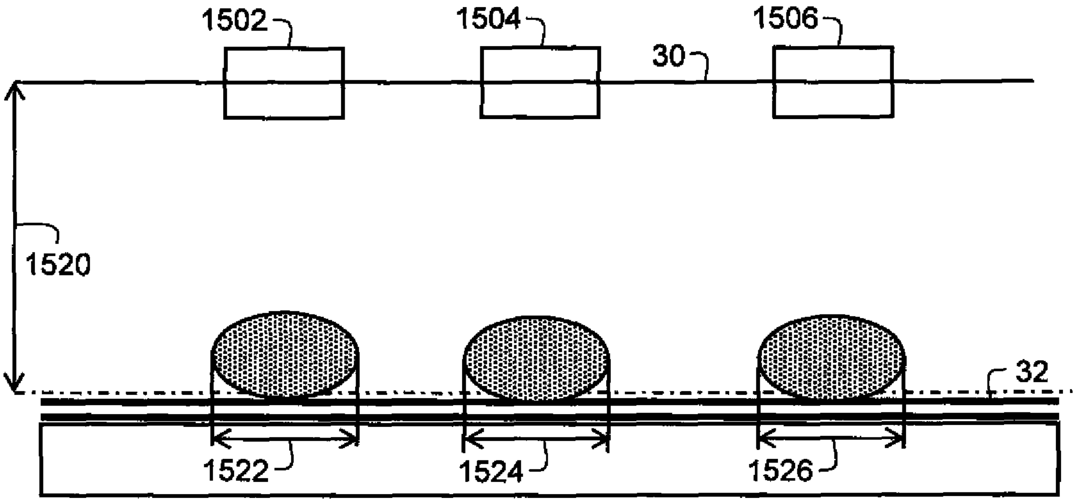

As is shown in FIG. 15B, when drops 1512, 1514 and 1516 strike receiver 32, these drops develop a first circular cross sectional radius 1522, 1524 and 1526. As the drop is absorbed into the receiver 32, the drops spread to a second circular cross sectional radii that are generally greater than first circular cross sectional radii 1522, 1524 and 1526. This has the effect of increasing the area of the surface that is colored by the ink from drops 15.

Figure 15C:
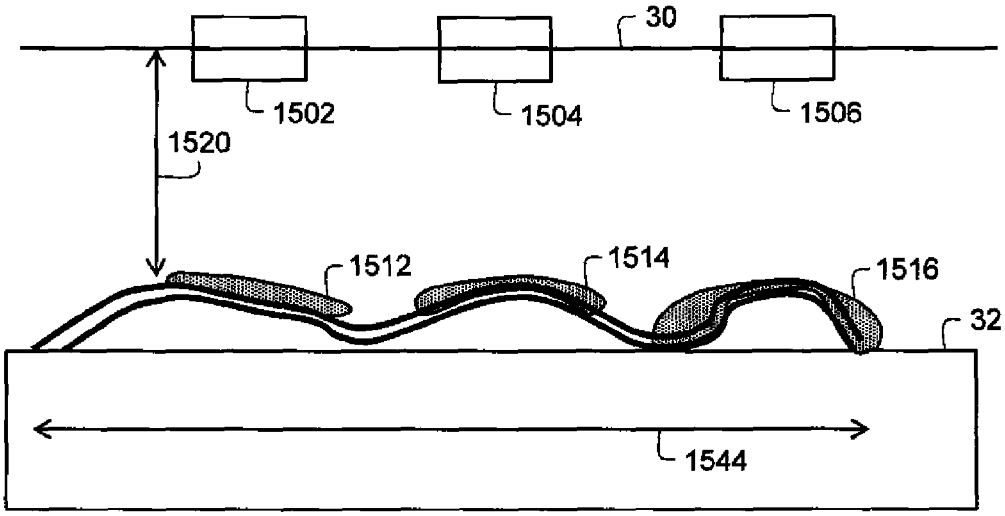

As is shown in FIG. 15C, as drops 1512, 1514 and 1516 continue to be absorbed, stresses in receiver 32 are loosened and certain portion of receiver 32 can begin to swell. This can cause portions of receiver 32 to cockle, bend and distort.

Also shown in FIG. 15C, where there is no effort to control these effects, the extent of such effects can significantly impact various aspects of receiver 32 that are critical for printing. As is shown in FIG. 15C these aspects include receiver flatness, which can impact printing distance 1520 from inkjet printhead 30 to receiver 32 and can substantially shorten this distance. Further as is shown in FIG. 15C, the overall width 1544 of receiver 32 can be changed. It will be appreciated to the extent that receiver 32 is not flat, ink from drops 1512, 1514 and 1516 may spread in different manners, with for example ink from drop 1512 spreading in a manner that is closer to drop 1514, while drop 1514 may exhibit symmetrical spread, and drop 1516 can exhibit an oversize spread due to the sharp extent of the slope of the cockle in that area. This spreading will impact optical density, color balance resolution and sharpness.

Figure 16:
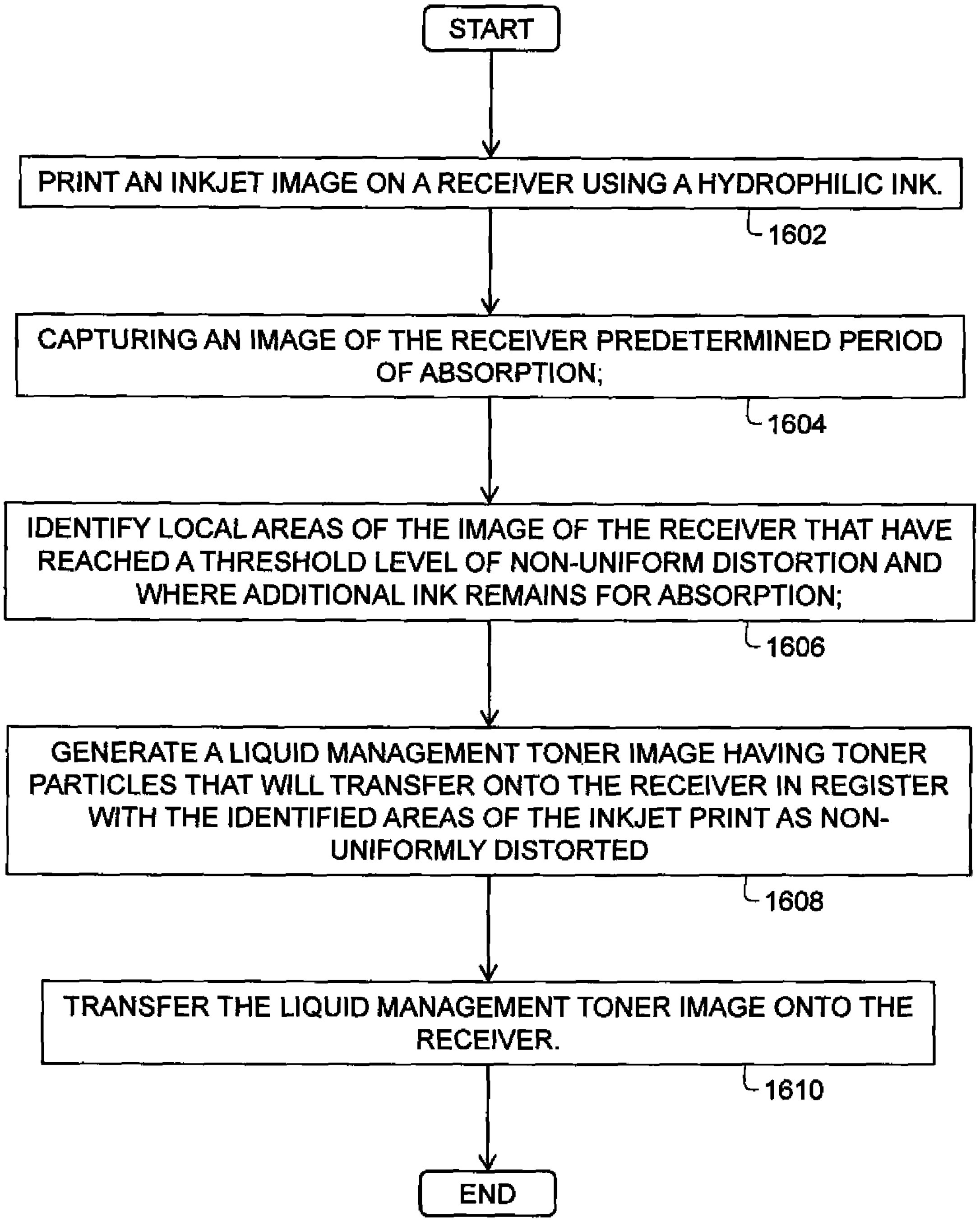
FIG. 16 illustrates yet another printing method.

FIG. 16 shows one embodiment of a method for controlling local distortion effects. As is shown in the embodiment of FIG. 16, in a first step an inkjet image is printed on a receiver 32 (step 1602) and an image of the first print is captured after a predetermined period of absorption (step 1602). In this regard sensor system 750 or peripheral system 730 can include an array imager, a line imager or any other system capable sensing conditions from which the extent of distortions in receiver 32 in an area of receiver 32 and an amount of ink remaining area 32. The sensing that forms such an image can be optical as occurs in an imager, electromagnetic, or mechanical.

The captured image is used by control system 701 to identify and quantify areas of the receiver that have reached a threshold level of non-uniform distortion and where additional ink remains for absorption (step 1606). Such areas can be identified on the basis of the sensed conditions and experimentally determined relationships between these sensed conditions and the existence of an area meeting these conditions.

Control system 701 can then cause toner print engine 722 to generate a liquid management toner image having toner particles that will transfer onto the receiver in register with the identified areas of the inkjet print as non-uniformly distorted (step 1608) and can cause toner print engine 722 to transfer the liquid management toner image onto receiver 32.

This places such toner particles in an unabsorbed volume of ink on the receiver 32 within which such toner can restrict or otherwise control or influence the flow of ink 40 in various ways to control what proportion of the ink enters the receiver, and therefore the extent of the ink based non-uniform distortions. Such control can be exerted on a pixel by pixel or area by area basis. In general, however, the liquid management toner image is used to reduce the extent to ink in the identified areas can cause such non-uniform distortions.

Figure 17:
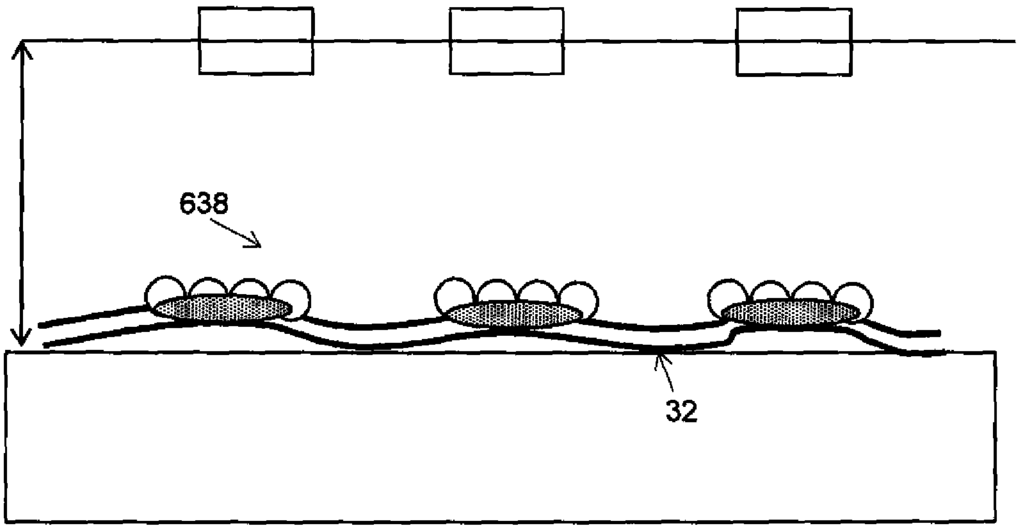
FIG. 17 shows a receiver having liquid management toner image.

Accordingly as is illustrated in FIG. 17, a receiver 32 having toner particles from a liquid management toner image 638 can exhibit less spatial distortion and more uniform ink coverage than one without. Further in various embodiments, the threshold level is within a range where effects of non-uniform distortion do not require a full image pixel or image line adjustment or at level that can be deleterious.

In another embodiment, the amount of toner particles supplied to an area in the liquid management toner image is determined based upon an amount of expansion or distortion during the predetermined period of absorption. Additionally or alternatively the amount of toner particles applied to an area of the receiver is determined based upon a known amount of ink jetted onto the receiver. In still another embodiment the amount of toner particles increases with a sensed volume of unabsorbed ink.

The liquid management toner image can further be generated to manage the flow of ink on the receiver to facilitate drying of the ink or to attract colorant from the ink so that the colorant is absorbed by the non-uniform distortion controlling toner image.

In one embodiment system controller 701 can determine that the distortion is least one of a localized printed area, axially asymmetric, and can occur in one dimension, two dimensions or three dimensions and wherein liquid management toner image 638 is adapted based upon the determined presence of each of these characteristics as desired.

Determining Areas

Figure 18:
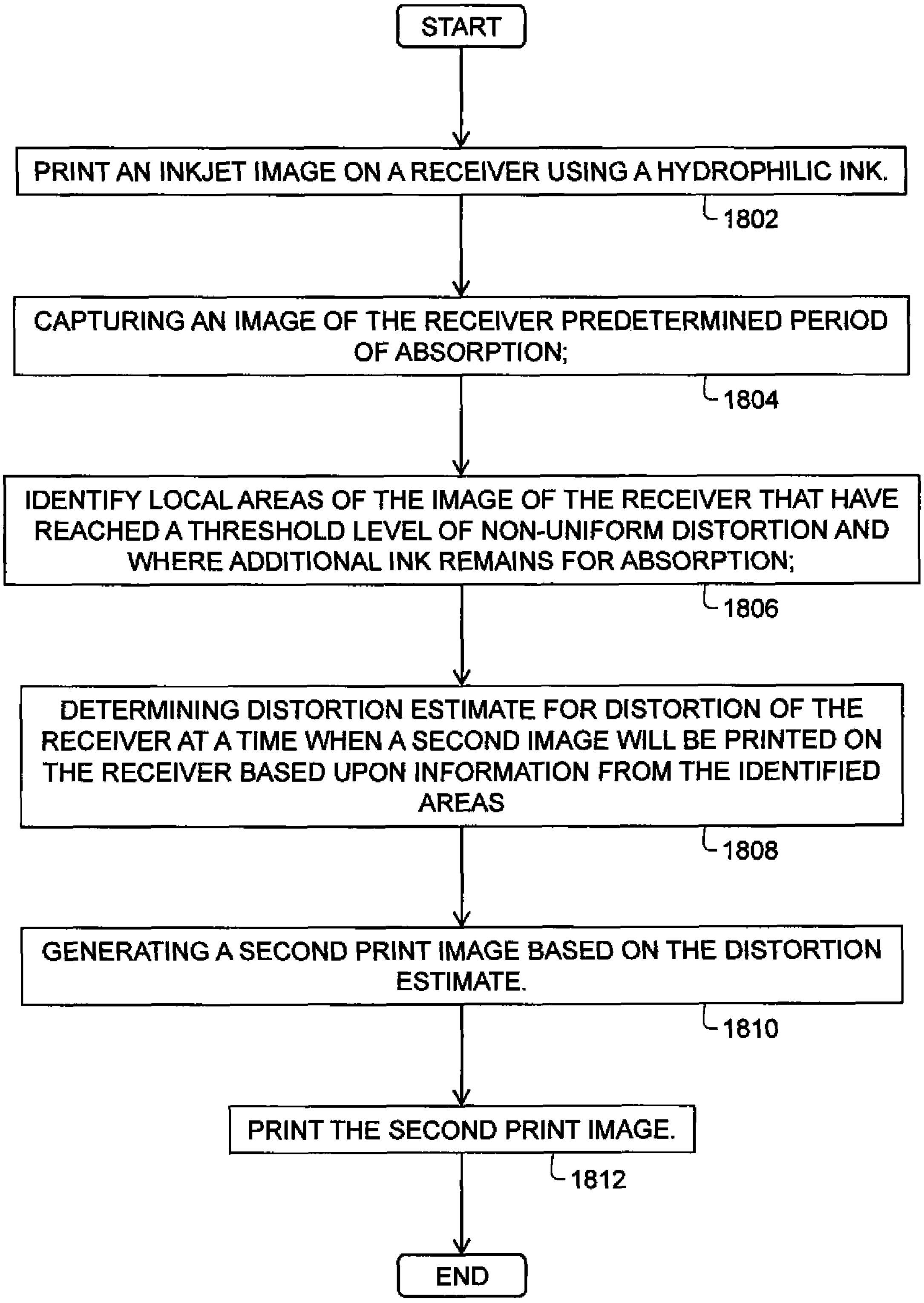
FIG. 18 illustrates a printing method.

As is noted above, distortion of the receiver 32 can occur in localized areas in significantly different extents when certain types of receivers are exposed to the levels of liquid in an ink jet print. Accordingly, to generate and to transfer a toner image (or any second print image) onto such a receiver an additional method is used. One embodiment of this method is shown in FIG. 18. As is shown in FIG. 18, in this embodiment a conventional inkjet printing process is used to print an ink jet print on a receiver using a hydrophilic ink 40 (step 1802). Thereafter an image is obtained as is described with respect to step 1604 above (1804) and local areas of the image of the receiver that have reached a threshold level of non-uniform distortion and where additional ink remains for absorption are identified (step 1806). This too can be done as is described in greater detail above.

However, in this method a distortion estimate is determined (step 1808). The distortion estimate consider the nature and extent to which the identified area have distorted at the image capture and the amount of ink deposited at each area and then generates a distortion estimate of the extent to which the receiver will be distorted and the nature of these distortions as well as anticipated interactions between adjacent distortions provide a mapping or transform that can be used by control system 701 to determine a pattern of printing that is most likely to provide a desired printed outcome at a time when a second printing operation is to begin.

The distortion estimate can follow a one dimensional, two dimensional, three dimensional model and/or analysis. The distortion estimate can also consider factors inside of the printing system that may influence the progression if any of the distortions.

A second print image is generated based upon the distortion estimate and image information for the second print image step 1810 and is printed step 1812.

References to "an embodiment" or "one embodiment" or "various embodiments" or the like refer to features that are present in at least one embodiment and are not exclusive of other embodiments unless so indicated or as are readily apparent to one of skill in the art. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

In certain examples herein, recording medium 32 has been described as being semi-absorbent or having a semi-absorbent surface. Recording mediums 32 with such a surface include graphic arts papers with a clay coating, e.g., Warren Offset Enamel, Potlatch Vintage Gloss, Potlatch Vintage Velvet, or Kromekote. Only a small amount of the hydrophilic liquid soaks into the semi-absorbent receiver 32 of this type. In general, as used herein a non-absorbent recording medium 32 is considered within.

In other embodiments herein, non-absorbent recording medium 32 has been described examples if this include without limitation TESLIN, a microvoided polymeric material, or polyethylene coated paper stock (used in photofinishing applications and designed to be submerged in aqueous solutions during a silver halide development process) are not suitable for use with this method. Papers and other types of substrates into the surface of which the hydrophilic liquid can penetrate, and in which resistivity is correlated with moisture content, are suitable for use.

In various embodiments, tactile prints are produced. Tactile prints are prints having raised features than can be perceived by the sense of touch. Examples include Braille prints, raised-letter prints, and raised-texture prints. In some of these embodiments, the toner deposited on the paper has a median volume-weighted diameter of at least 20 μm. In some of these embodiments, the toner is clear, or uncolored, or does not contain a colorant. The toner therefore provides texture without significantly affecting the appearance of any content present underneath the toner. In some of these embodiments, clear toner is used together with hydrophilic liquid containing colorants, e.g., dyes or pigments. This provides prints having color images or other patterns printed with the hydrophilic liquid and tactile features formed from the clear toner over those patterns.

In various embodiments, toner 602 deposited on recording medium 32 includes thermoplastic polymer binders. Some of these binders will cross-link when activated (e.g., by heat or UV, as discussed above), and some of these binders will not. The latter will soften when exposed to heat during fixing or glossing then return to a glassy state when they cool. Toners containing binders of the former type are referred to herein as "thermosettable toners." Toners containing binders of the latter type are referred to herein as "fusible toners." The binders of both thermosettable toners and fusible toners are in the thermoplastic state when the toner is deposited on the recording medium. After thermosettable toners are fixed, their binders are in the thermoset state.

In various embodiments, thermosettable toners are used. The hydrophilic liquid has no significant chemical interactions with the binders, and the binders cross-link when activated.

In various embodiments, thermosettable toners are used. The hydrophilic liquid reacts chemically with the thermosettable toners to cause the toners to cross-link. This reaction can take place on contact, during deposition step 1440, or take place upon activation in fusing.

The invention has been described in detail with particular reference to certain preferred embodiments thereof, but it will be understood that variations, combinations, and modifications can be effected by a person of ordinary skill in the art within the spirit and scope of the invention.

What is claimed is:

1. A method for operating a printing system comprising:

printing an inkjet image on a receiver using a hydrophilic ink;

capturing an image of the inkjet print after a predetermined period of absorption of said ink into said receiver;

identifying local areas of the image of the inkjet print that have reached a threshold level of non-uniform distortion and where unabsorbed volumes of the ink remain for absorption;

generating a liquid management toner image having toner particles that will transfer onto the receiver in register with the identified areas of the image of the inkjet print; and transferring the liquid management toner image onto the receiver in register with the identified areas;

wherein the liquid management toner image reduces absorption of ink in the receiver in the identified areas to control an extent of distortion in the identified areas.

2. The method of claim 1, wherein the threshold level is within a range where effects of non-uniform distortion do not require a full image pixel adjustment.

3. The method of claim 1, wherein an amount of the toner particles in the liquid management toner image is generated based upon an amount of expansion or distortion during the predetermined period of absorption.

4. The method of claim 1, wherein an amount of toner particles in the liquid management toner image is determined based upon a known amount of ink jetted onto the receiver.

5. The method of claim 1, wherein an amount of toner particles in the liquid management toner image monotically increases with amount of applied ink for the inkjet print.

6. The method of claim 1, wherein the toner particles in the liquid management toner image further manages a flow of ink on the receiver to facilitate drying of the ink.

7. The method of claim 1, wherein the liquid management toner image further attracts colorant from the ink so that the colorant is absorbed by the liquid management toner image.

8. The method of claim 1, wherein the distortion can occur in one dimension, two dimensions or three dimensions.

* * * * *